United States Patent
Amanuma et al.

(10) Patent No.: US 6,767,310 B2
(45) Date of Patent: Jul. 27, 2004

(54) CONTROL SYSTEM FOR FRONT-AND-REAR WHEEL DRIVE VEHICLE

(75) Inventors: Hirokatsu Amanuma, Saitama-ken (JP); Yasuhiko Sugo, Saitama-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 63 days.

(21) Appl. No.: 10/199,072

(22) Filed: Jul. 22, 2002

(65) Prior Publication Data

US 2003/0033070 A1 Feb. 13, 2003

(30) Foreign Application Priority Data

Aug. 10, 2001 (JP) ........................................ 2001-244153

(51) Int. Cl.[7] .............................................. B60K 41/02
(52) U.S. Cl. ...................... 477/174; 180/65.4; 180/65.2
(58) Field of Search ............................. 701/67, 68, 69, 701/64, 53, 51, 36, 1; 180/165, 233, 234, 242, 243, 245, 246, 252, 345, 337, 367, 65.2, 65.3, 65.4; 303/2, 3, 5, 6.01, 10, 11, 13, 15; 60/639, 325; 477/34, 38, 39, 50, 174; 192/85 C, 86

(56) References Cited

U.S. PATENT DOCUMENTS

| | | | | |
|---|---|---|---|---|
| 5,105,922 A | * | 4/1992 | Yant | 192/3.58 |
| 5,944,159 A | * | 8/1999 | Schneider et al. | 192/85 C |
| 6,575,870 B2 | * | 6/2003 | Kitano et al. | 477/3 |
| 2001/0042649 A1 | * | 11/2001 | Maeda et al. | 180/65.4 |

* cited by examiner

*Primary Examiner*—Dirk Wright
(74) *Attorney, Agent, or Firm*—Arent Fox PLLC

(57) ABSTRACT

There is provided a control system for a front-and-rear wheel drive vehicle which connects and disconnects one pair of respective pairs of front wheels and rear wheels to and from an electric motor for driving the one pair of wheels by a clutch of a type actuated by pressure. The control system is capable of engaging the clutch promptly and reliably, thereby enabling excellent startability of the vehicle and a sufficient total driving force for the vehicle. In the control system, the front wheels are driven by an engine, the rear wheels are driven by the electric motor via the clutch, and the clutch is actuated by accumulator pressure, whereby the rear wheels and the electric motor are connected to and disconnected from each other. The control system increases the accumulator pressure by driving an electric oil pump when the accumulator pressure is equal to or lower than an operating pressure.

3 Claims, 18 Drawing Sheets

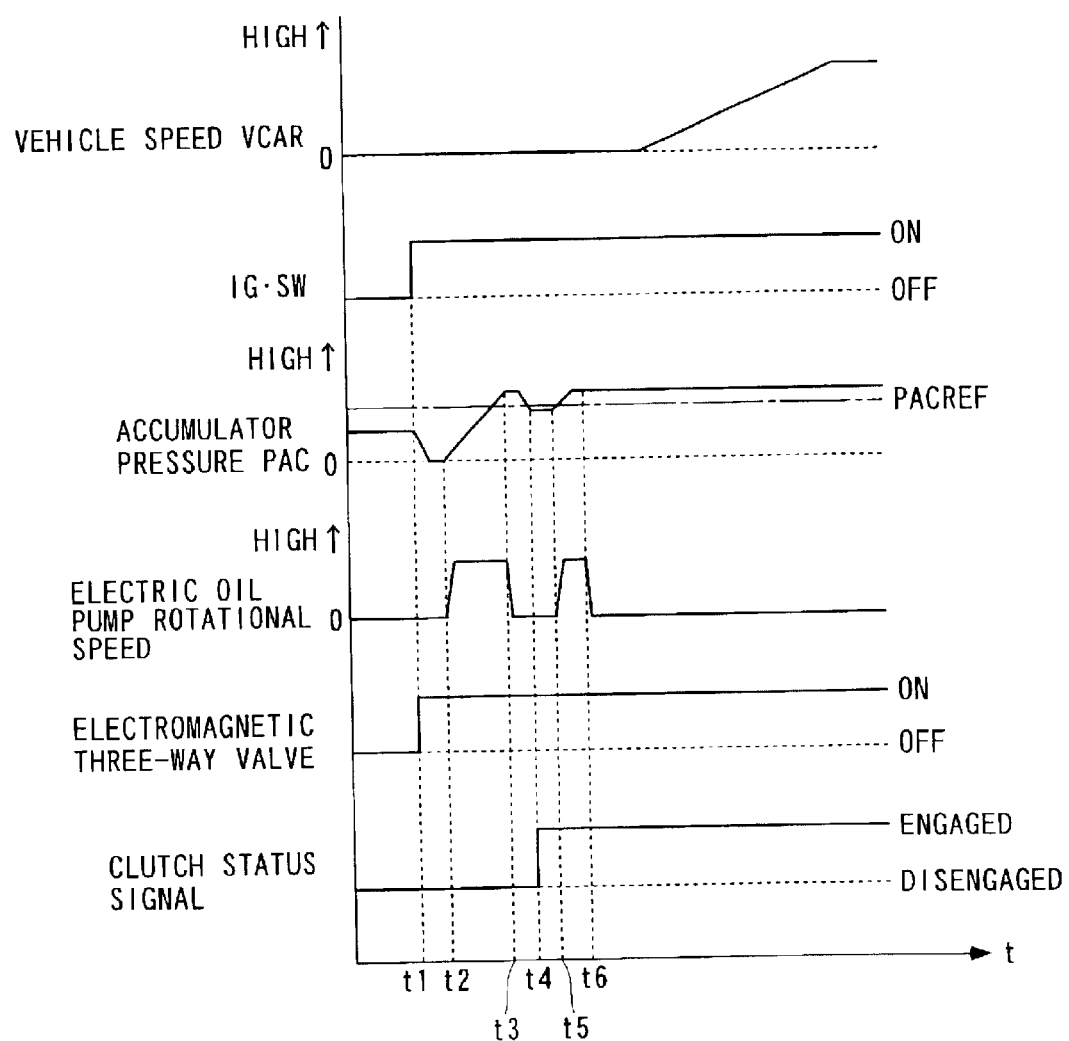
F I G. 11

CONTROL SYSTEM FOR FRONT-AND-REAR WHEEL DRIVE VEHICLE

BACKGROUND OF THE INVENTION

1. Field of the Invention

This invention relates to a control system for a front-and-rear wheel drive vehicle, which drives one pair of respective pairs of front wheels and rear wheels by an engine and the other pair of the pairs by an electric motor, and connects and disconnects the other pair of the pairs to and from the electric motor by a clutch of a type actuated by pressure.

2. Description of the Prior Art

Conventionally, a control system for a front-and-rear wheel drive vehicle is disclosed e.g. in Japanese Laid-Open Patent Publication (Kokai) No. 9-315164, which drives one pair of respective pairs of front wheels and rear wheels by an engine and drive the other pair of the pairs by an electric motor. In the front-and-rear wheel drive vehicle disclosed in this publication, the front wheels are driven by the engine, the rear wheels are driven by the electric motor, and the clutch is arranged to connect and disconnect between the rear wheels and the electric motor. In the control system, the clutch is engaged when the vehicle speed is lower than a first predetermined speed including during stoppage of the vehicle, and disengaged when the vehicle speed has reached a second predetermined speed higher than the first predetermined speed. Thus, the clutch is controlled to an engaged state when the vehicle makes a start or drives off.

Further, as the clutch for a wheel-driving system, a so-called hydraulically-actuated clutch is conventionally known, which is engaged or disengaged by supply of oil pressure from a clutch-actuating mechanism. The clutch-actuating mechanism of this kind includes a type comprised of an oil pump driven by a driving force of the wheel-driving system and an accumulator for accumulating oil pressure increased by the oil pump. In the clutch-actuating mechanism constructed as above, the clutch is engaged by the oil pressure from the accumulator when the vehicle makes a start.

When the above-mentioned the hydraulically-actuated clutch and clutch-actuating mechanism are applied to the control system for a front-and-rear wheel drive vehicle, the oil pump is driven for the hydraulically-actuated clutch, by the driving force of the wheel-driving system, and hence the pressure in the accumulator is sometimes considerably reduced if the vehicle is standing for a long time period. In such a case, when the vehicle makes a start, the clutch cannot be fully engaged only by the oil pressure from the accumulator, and further can be fully engaged only after oil pressure is supplied from the oil pump after the vehicle has traveled over a certain distance. Therefore, during the start of the vehicle, there temporarily occurs a front wheel-drive state in which the vehicle has only its front wheels driven by the engine, causing shortage of a total driving force for driving the vehicle. This makes it impossible to ensure sufficient startability of the vehicle on a road having a small surface resistance. Further, also in an operating condition in which the vehicle repeatedly switches between very low-speed travelling close to stoppage and normal travelling, the pressure in the accumulator is reduced due to repetition of engagement and disengagement of the clutch, which can eventually hinder full engagement of the clutch. In this case as well, there temporarily occurs the front wheel-drive state of the vehicle in which the vehicle is driven by the engine alone, causing the shortage of the total driving force for driving the vehicle. Especially, the front-and-rear wheel drive vehicle of this kind is in strong demand for use on roads having small surface resistances, such as snowy roads, or rough roads on which the vehicle is compelled to repeatedly switch between very low-speed travelling and normal travelling. Therefore, the incapability of ensuring sufficient startability or possibility of incurring shortage of a total driving force for driving the vehicle leads to reduced marketability of the vehicle.

SUMMARY OF THE INVENTION

It is an object of the invention to provide a control system for a front-and-rear wheel drive vehicle which connects and disconnects one pair of respective pairs of front wheels and rear wheels to and from an electric motor for driving the one pair by a clutch of a type actuated by pressure, in which the control system is capable of causing engagement of the clutch promptly and reliably when the vehicle makes a start and when the vehicle is travelling, thereby ensuring excellent startability of the vehicle and a sufficient total driving force for driving the vehicle.

To attain the above object, the present invention provides a control system for a front-and-rear wheel drive vehicle that drives one pair of respective pairs of front wheels and rear wheels by an engine and the other pair of the pairs by an electric motor via a clutch of a type actuated by pressure, and drives the clutch by accumulator pressure increased by a pump and accumulated in an accumulator to connect and disconnect the other pair to and from and the electric motor.

The control system according to the present invention is characterized by comprising:

pressure-detecting means for detecting the accumulator pressure;

clutch-actuating means for selectively engaging and disengaging the clutch by supplying the accumulator pressure to the clutch;

pump-driving means for driving the pump; and control means for causing the pump-driving means to drive the pump to thereby increase the accumulator pressure when the detected accumulator pressure is equal to or lower than a predetermined value.

According to this control system, when the accumulator pressure is equal to or lower than the predetermined value, the control means causes the pump-driving means to drive the pump to thereby increase the accumulator pressure, and the clutch-actuating means actuates the clutch by using the accumulator pressure thus increased, whereby the other pair of wheels and the electric motor are connected to or disconnected from each other. As described above, by driving the pump-driving means, the accumulator pressure can be held such that it can engage or disengage the clutch, irrespective of a traveling state of the vehicle, and hence it is possible to engage or disengage the clutch at any time promptly and reliably. As a result, when it is required to drive the other pair of wheels by the electric motor, it is possible to drive them promptly and reliably, thereby ensuring a sufficient total driving force for driving the vehicle and enhancing of the marketability of the vehicle.

Preferably, the control system further comprises start-detecting means for detecting a start of the engine, and the clutch-actuating means engages the clutch when the start of the engine is detected by the start-detecting means.

According to this preferred embodiment, when the start of the engine is detected, the accumulator pressure is supplied to the clutch by the clutch-actuating means to thereby engage the clutch. In this process, the accumulator pressure is held by the control means such that the accumulator pressure can engage and disengage the clutch, so that when the vehicle is started, the clutch can be engaged promptly and reliably, whereby the other pair of wheels can be driven promptly and reliably by the electric motor. This makes it possible to ensure an excellent startability of the vehicle even on roads having small surface resistances, thereby further enhancing the marketability of the vehicle.

Preferably, the pump is an electrically driven pump, and the pump-driving means comprises an electric motor provided separately from the electric motor for driving the other pair.

Alternatively, the pump is a mechanically driven pump, and the pump-driving means comprises means for mechanically connecting between the mechanically drive pump and the electric motor for driving the other pair.

The above and other objects, features, and advantages of the invention will become more apparent from the following detailed description taken in conjunction with the accompanying drawings.

BRIEF DESCRIPTION OF THE DRAWINGS

FIG. 11 is a timing chart showing an example of a vehicle start operation;

DETAILED DESCRIPTION OF PREFERRED EMBODIMENTS

Figure 1:
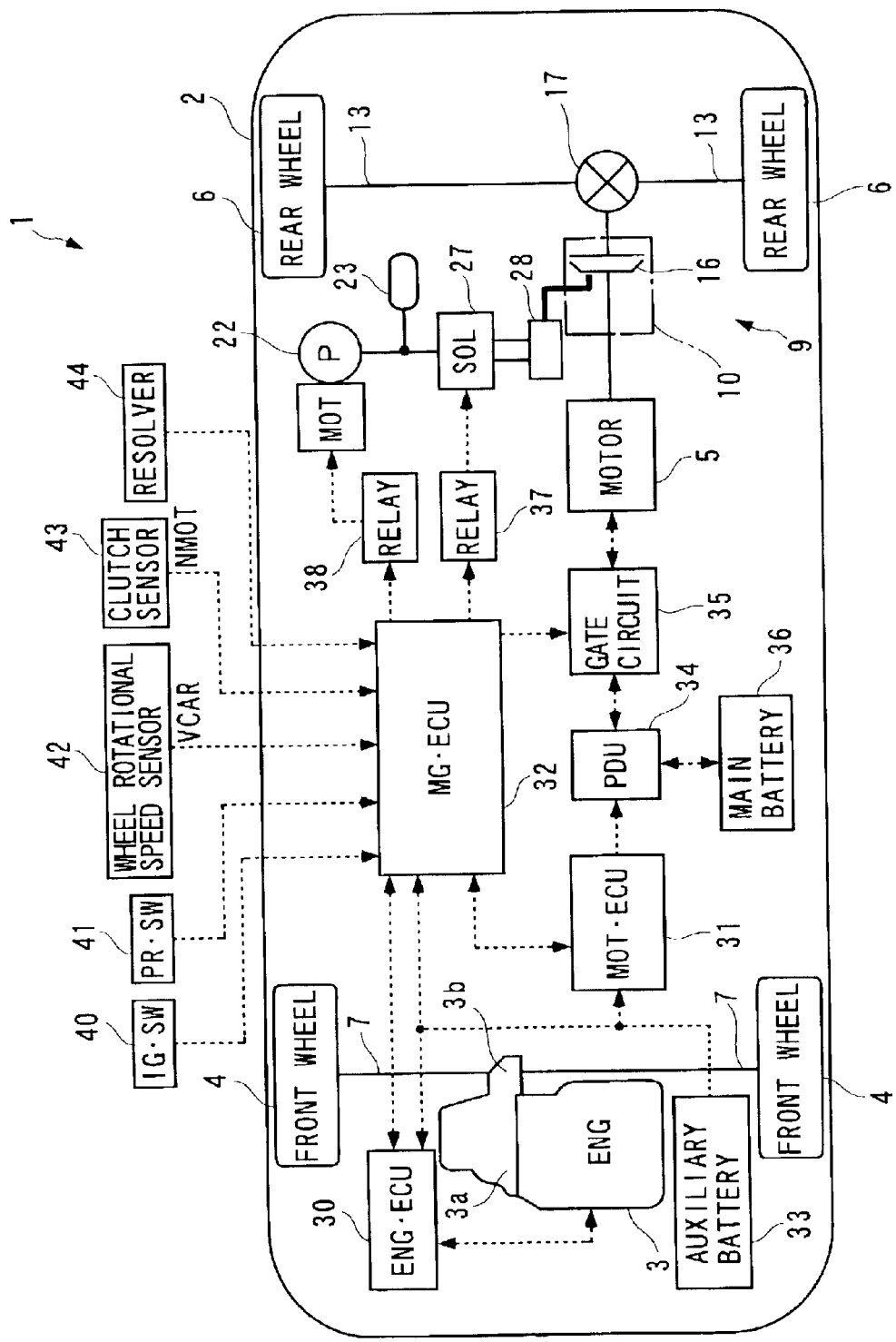
FIG. 1 is a block diagram schematically showing the arrangement of a front-and-rear wheel drive vehicle incorporating a control system according to a first embodiment of the invention.

The invention will now be described in detail with reference to the drawings showing preferred embodiments thereof. Referring first to FIG. 1, there is schematically shown the arrangement of a front-and-rear wheel drive vehicle (hereinafter simply referred to as "the vehicle") 2 to which is applied a control system according to a first embodiment of the invention. As shown in the figure, the vehicle 2 is of a type which has left and right front wheels 4, 4 (one pair of respective pairs of front wheels and rear wheels) driven by an engine 3 and left and right rear wheels 6, 6 (the other pair of the respective pairs of the front wheels and rear wheels) driven by an electric motor (hereinafter simply referred to as "the motor") 5.

The engine 3 is transversely mounted in a front portion of the vehicle 2 and connected to the left and right front wheels 4, 4 via an automatic transmission 3a, a front differential mechanism 3b, left and right front drive shafts 7, 7, etc.

Figure 2:
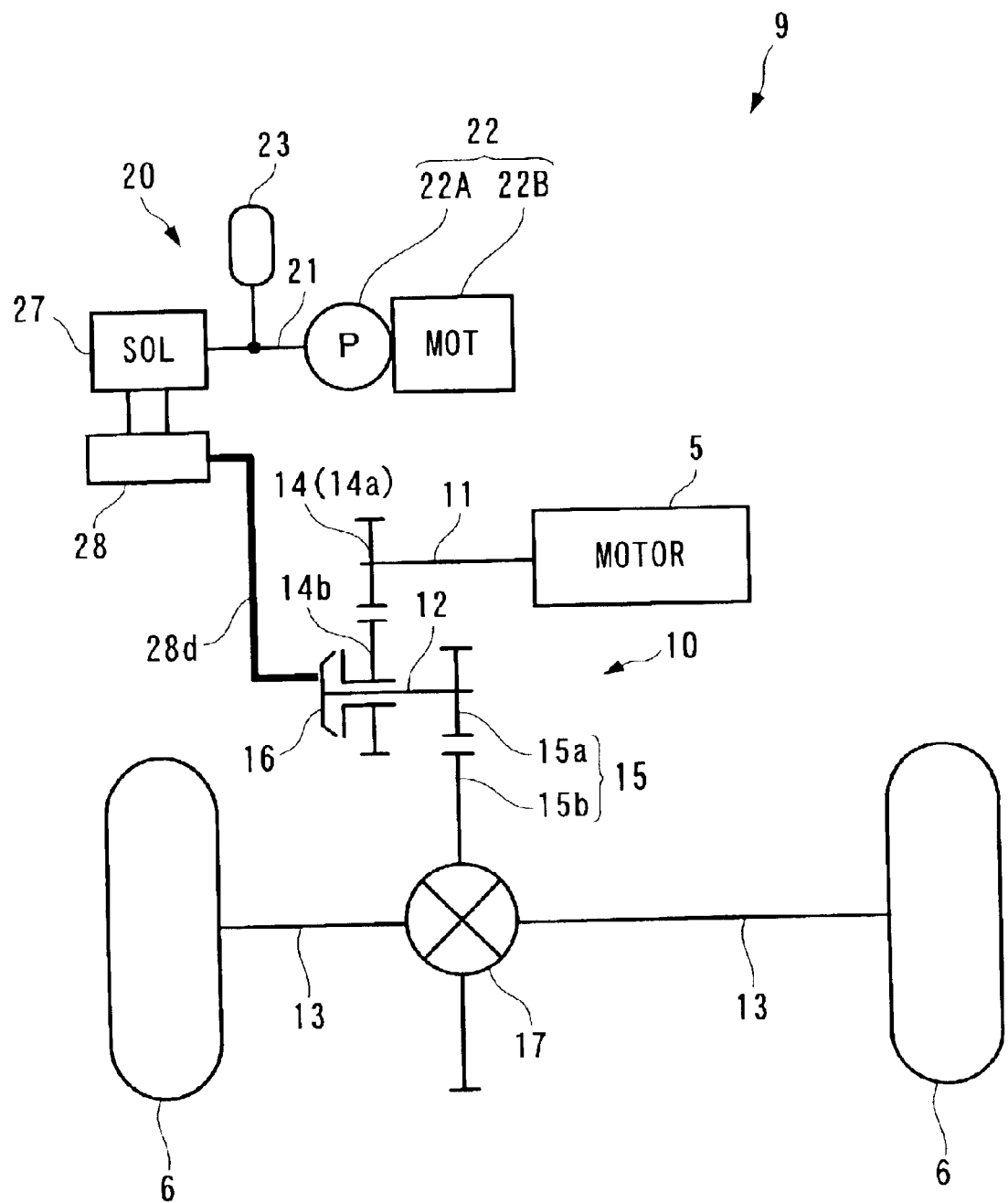
FIG. 2 is a block diagram schematically showing the arrangement of a rear wheel-driving mechanism of the front-and-rear wheel drive vehicle.

The motor 5 is connected to the left and right rear wheels 6, 6 via a rear wheel-driving mechanism 9. Referring to FIG. 2, the rear wheel-driving mechanism 9 comprises a reduction mechanism 10 including a clutch 16, a rear differential mechanism 17, left and right rear drive shafts 13, 13, and a clutch-actuating mechanism 20. The motor 5, the reduction mechanism 10, the rear differential mechanism 17, and so forth are accommodated in a casing, not shown, a lower section of which forms an oil pan 8 for storing oil (see FIG. 3).

Further, the motor 5 is formed by a servo motor, and also servers as a generator for generating electric power when it is driven for rotation by traveling energy of the vehicle 2. A main battery 36, referred to hereinafter, is charged with regenerated electric power produced by the motor 5.

The reduction mechanism 10 transmits the rotation of the motor 5 to the rear differential mechanism 17 while reducing the rotation in two stages, and comprises an output shaft 11 and an intermediate shaft 12 arranged in parallel with each other, a first reduction gear pair 14 arranged on the above shafts 11, 12, a second reduction gear pair 15 arranged on the intermediate shaft 12 and the rear drive shaft 13, and a clutch 16 arranged on the intermediate shaft 12.

The output shaft 11 is rotatably supported by the casing, and connected to a rotor, not shown, of the motor 5 for rotation in unison with the rotor. Further, the output shaft 11 has a reduction gear 14a integrally formed thereon, and the reduction gear 14a is always meshed with a reduction gear 14b, referred to hereinafter, to form the first reduction gear pair 14 together with the reduction gear 14b.

The intermediate shaft 12 is rotatably supported by the casing. The intermediate shaft 12 has a reduction gear 15a, the reduction gear 14b, and the clutch 16 arranged thereon in the mentioned order at respective locations from a side closer in location to the motor 5. The reduction gear 15a is integrally formed on the intermediate shaft 12 and always meshed with a drive gear 15b, referred to hereinafter, of the rear differential mechanism 17.

In the following, the clutch 16 will be described with reference to FIG. 3. It should be noted that in the figure, hatching for showing cross-sectional portions is omitted for clarity. As shown in the figure, the clutch 16 is of a servo synchronous mesh type which comprises a sleeve 16a, a hub 16b, a blocking ring 16c, a gear 16d, a synchronizing spring, not shown, and so forth. The clutch 16 is configured similarly to a clutch which is disclosed e.g. in Japanese Patent Publication (Kokoku) No. 48-24096. The hub 16b is integrally mounted on the intermediate shaft 12.

The sleeve 16a is fitted to the hub 16b by spline fitting. This enables the sleeve 16a to slide along the hub 16b between an engaged position where the clutch 16 is engaged and a disengaged position where the clutch 16 is disengaged. As will be described hereinbelow, the sleeve 16a is driven to one of the above two positions by the clutch-actuating mechanism 20.

Further, the reduction gear 14b is an idle (i.e. freely rotatable) gear which is rotatably fitted on the intermediate shaft 12. The gear 16d is in the form of dog teeth and integrally formed with the reduction gear 14b at a location close to the blocking ring 16c for the reduction gear 14b. Further, the sleeve 16a includes gear teeth, not shown, in the form of dog teeth. When the sleeve 16a is moved to the engaged position, the gear teeth thereof are meshed with those of the gear 16d whereby the clutch 16 is engaged. This causes the output shaft 11 and the intermediate shaft 12 to be connected to each other via the first reduction gear pair 14 and the clutch 16.

The rear differential mechanism 17 is formed by a combination of a pair of side gears, not shown, and a pair of pinion gears, not shown, and includes the drive gear 15b integrally formed with a differential case. The drive gear 15b forms the second reduction gear pair 15 together with the reduction gear 15a.

Figure 3:
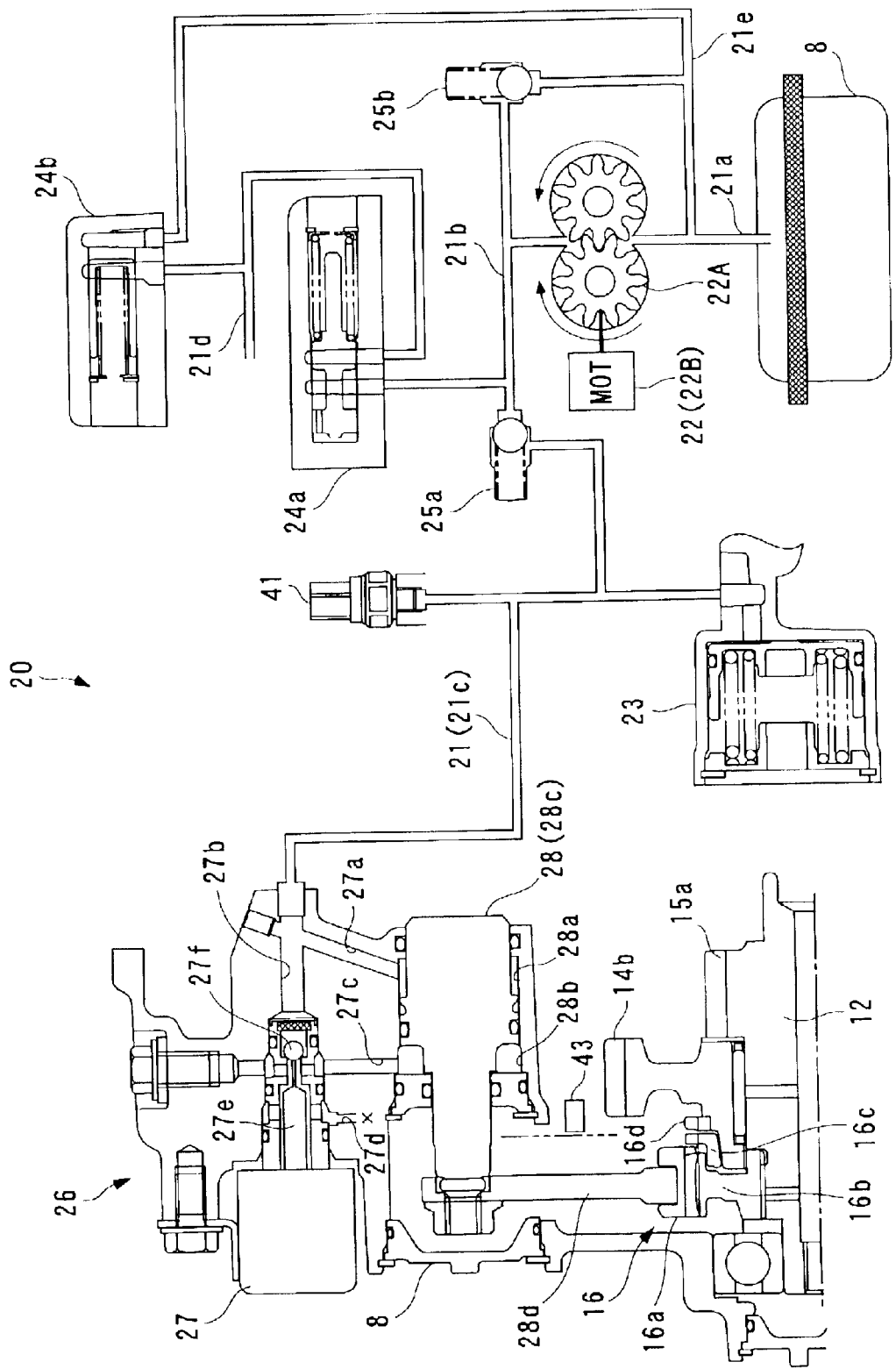
FIG. 3 is a block diagram schematically showing the arrangement of a clutch-actuating mechanism.

Further, the clutch-actuating mechanism 20 (clutch-actuating means) comprises an oil passage 21, an electric oil pump 22, an accumulator 23, two relief valves 24a, 24b, two one-way valves 25a, 25b, and a hydraulic actuator 26 (see FIG. 3). The oil passage 21 includes a suction oil passage 21a, a delivery oil passage 21b, a actuating oil passage 21c, a lubricant oil passage 21d, a reverse oil passage 21e, etc.

The electric oil pump 22 is a combination of a mechanical oil pump 22A and an electric motor 22B. The electric motor 22B (pump driving means) is electrically connected to an MG•ECU 32 via a relay 38, referred to hereinafter. The oil pump 22A (pump) is a gear pump device containing two gears 22a, 22a meshed with each other. One of the gears 22a, 22a is connected to a rotating shaft of the electric motor 22B.

The oil pump 22A has a suction hole connected to one end of the suction oil passage 21a which has the other end thereof located in oil within the oil pan 8. Thus, oil in the oil pan 8 can be sucked into the electric oil pump 22 by way of the suction oil passage 21a. Further, the suction oil passage 21a has an intermediate portion thereof connected to the relief valve 24b by the reverse oil passage 21e.

Further, the electric oil pump 22 has a discharge port connected to the relief valve 24a by the delivery oil passage 21b. The delivery oil passage 21b has an intermediate portion thereof connected to the accumulator 23 and the hydraulic actuator 26 by the actuating oil passage 21c via the one-way valve 25a.

The above accumulator 23 is arranged in parallel with the hydraulic actuator 26, and accumulates part of oil pressure increased by the electric oil pump 22. The accumulator 23 is used for supplying the accumulated oil pressure to the hydraulic actuator 26, thereby engaging or disengaging the clutch 16, and has a larger capacity than a predetermined volume VACREF, referred to hereinafter.

Further, the one-way valve 25a is used for preventing oil from flowing back in the actuating oil passage 21c from the accumulator 23 to the electric oil pump 22, and arranged at an intermediate location between the accumulator 23 and the electric oil pump 22. This enables the oil pressure accumulated in the accumulator 23 and the oil pressure in the actuating oil passage 21c to be maintained such that they are not reduced during stoppage of the electric oil pump 22 so long as the clutch 16 is not actuated by the hydraulic actuator 26. It should be noted that even when the hydraulic actuator 26 is operating, the oil pressure accumulated in the accumulator 23 is approximately equal to the oil pressure in the actuating oil passage 21c and therefore, hereinafter, the oil pressure in the accumulator 23 and the oil pressure in the actuating oil passage 21c are collectively referred to as "the accumulator pressure PAC".

Further, a pressure switch (denoted as "PR•SW" in FIG. 1) 41 is arranged in the actuating oil passage 21c at a location close to the accumulator 23. The pressure switch 41 (pressure-detecting means) is formed e.g. by a piezoelectric element and electrically connected to the MG•ECU 32. The pressure switch 41 carries out ON/OFF operation in dependence on the accumulator pressure PAC. When the accumulator pressure PAC is higher than a predetermined operating pressure PACREF (predetermined value), the pressure switch 41 is turned on, whereas when the accumulator pressure PAC is equal to or lower than the predetermined operating pressure PACREF, it is turned off.

Figure 4:
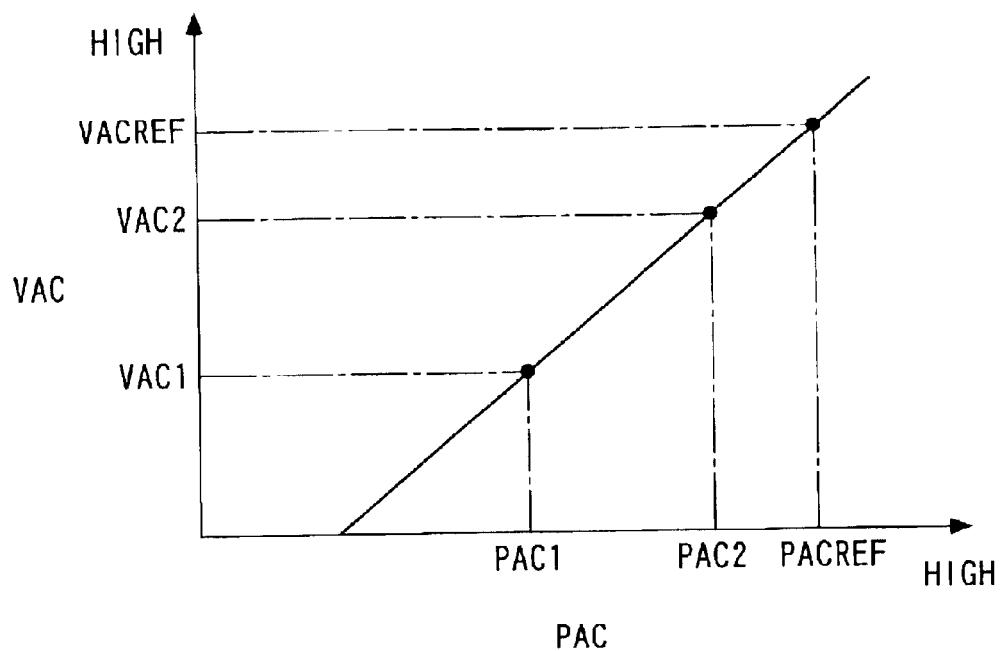
FIG. 4 is a diagram which is useful in explaining an operating pressure set by operating an oil pressure switch.

In the following, a manner of setting the above operating pressure PACREF will be described with reference to FIG. 4. The figure shows the relationship between an accumulator volume VAC defined as the amount of oil stored in the accumulator 23, and the accumulator pressure PAC. As shown in the figure, the accumulator volume VAC of the accumulator 23 increases as the accumulator pressure PAC becomes higher, and when the accumulator pressure PAC is equal to a predetermined pressure PAC1, a predetermined volume VAC1 required for disengaging the clutch 16 is secured, and when the accumulator pressure PAC is equal to a predetermined pressure PAC2 higher than the predetermined pressure PAC1, a predetermined volume VAC1 required for engaging the clutch 16 is secured.

Therefore, to detect whether or not a predetermined accumulator volume VACREF (>VAC2) sufficient to engage and disengage the clutch 16 is secured, the operating pressure PACREF is set to a value higher than the predetermined pressure PAC2. Accordingly, when the pressure switch 41 is changed from the OFF state to the ON state, the MG•ECU 32 determines that the predetermined accumulator volume VACREF sufficient to engage or disengage the clutch 16 is secured.

Due to the construction described above, when driven by the MG•ECU 32, the gears 22a, 22a of the electric oil pump 22 rotate in respective directions indicated by arrows in FIG. 3 to thereby increase oil pressure, and supply the increased oil pressure to the accumulator 23 and the hydraulic actuator 26. In this process, when the oil pressure within the delivery oil passage 21b becomes equal to or higher than a predetermined pressure higher than the operating pressure PACREF, the relief valve 24a is opened, whereby a portion of the oil within the delivery oil passage 21b is supplied to a lubricating system including e.g. the rear differential mechanism 17, via the lubricant oil passage 21d, and then returned to the oil pan 8.

On the other hand, when the gears 22a, 22a of the electric oil pump 22 rotate in opposite directions to the respective directions indicated by the arrows in FIG. 3, oil on the discharge side of the electric oil pump 22 is returned to the suction oil passage 21a. In this process, oil pressure on the side of the accumulator 23 and the hydraulic actuator 26 is maintained by the one-way valve 25a. If the oil pressure within the suction oil passage 21a and the reverse oil passage 21e becomes equal to or higher than a predetermined pressure due to the return of the oil to the suction oil passage 21a, the relief valve 24b is opened, whereby a portion of the oil in the reverse oil passage 21e is supplied to the lubricating system by way of the lubricant oil passage 21d. Further, if it is impossible to suppress a rise in the oil pressure within the reverse oil passage 21e simply by opening the relief valve 24b, the one-way valve 25b is also opened, whereby an additional portion of the oil in the reverse oil passage 21e is discharged to the delivery oil passage 21b to suppress the rise in the oil pressure within the reverse oil passage 21e (and the suction oil passage 21a as well).

Further, the hydraulic actuator 26 comprises an electromagnetic three-way valve 27 connected to the actuating oil passage 21c, and a hydraulic servo piston mechanism 28 to which is supplied oil pressure via the electromagnetic three-way valve 27.

The electromagnetic three-way valve 27 is electrically connected to the MG•ECU 32 via a relay 37, referred to hereinafter, and includes a solenoid, not shown, four oil passages 27a, 27b, 27c, 27d, a plunger 27e, and a spherical valve element 27f. The actuating oil passage 21c communicates with an oil chamber 28a of the hydraulic servo piston mechanism 28 via the oil passage 27a, and an oil chamber 28b of the same via the oil passages 27b, 27c. Further, the oil passage 27d has one end communicating with a leak port.

Responsive to a driving signal from the MG•ECU 32, the solenoid is selectively energized and deenergized whereby the electromagnetic three-way valve 27 has the oil passages 27b, 27c and the oil passages 27c, 27d thereof alternately switched between a mutually communicated state and a cut-off state. More specifically, when the electromagnetic three-way valve 27 is in an OFF state, that is, when the solenoid thereof is in a deenergized state, the plunger 27e and the valve element 27f are held at respective locations shown in FIG. 3, whereby the oil passages 27b, 27c are disconnected from each other by the valve element 27f, while the oil passages 27c, 27d are communicated with each other. This allows oil pressure from the actuating oil passage 21c to be supplied only to the oil chamber 28a of the hydraulic servo piston mechanism 28 via the oil passage 27a.

On the other hand, when the electromagnetic three-way valve 27 is turned on, that is, when the solenoid thereof is energized, the plunger 27e is actuated from the position shown in FIG. 3 in the direction of the valve element 27f to thereby disconnect the oil passages 27c, 27d from each other, and at the same time moves the valve element 27f leftward to thereby communicate the oil passages 27b, 27c with each other. This allows oil pressure from the actuating oil passage 21c to be supplied to the oil chamber 28a via the oil passage 27a and to the oil chamber 28b via the oil passages 27b, 27c, respectively.

Further, the hydraulic servo piston mechanism 28 comprises a piston 28c slidable in the left-right direction as viewed in FIG. 3, an arm 28d having one end thereof connected to one end of the piston 28c. When oil pressure from the actuating oil passage 21c is supplied only to the oil chamber 28a, the piston 28c is held in the position shown in FIG. 3, whereas when the oil pressure is supplied to both of the oil chambers 28a, 28b, the piston 28c is moved rightward as viewed in FIG. 3 by a difference in applied pressures caused by a difference in areas receiving the oil pressure, thereby causing the arm 28d to be moved to a position indicated by a two-dot chain line in FIG. 3.

Further, the other end of the arm 28d, opposite to the one end connected to the one end of the piston 28c is fitted in a groove of the sleeve 16a of the clutch 16. The sleeve 16a is held in the aforementioned disengaged position when the arm 28d is in a position indicated by solid lines illustrating the same in FIG. 3, whereas when the arm 28d is moved to the position indicated by the two-dot chain line, the sleeve 16a is moved to the aforementioned engaged position.

As described above, in the clutch-actuating mechanism 20, the clutch 16 is switched between the engaged state and the disengaged state as the electromagnetic three-way valve 27 is turned on and off. Further, in the clutch-actuating mechanism 20, a component part, such as a manual valve, which is configured to cause oil leakage under predetermined conditions, is not provided, and hence the rate of decrease in the accumulator pressure PAC is so small that the accumulator pressure PAC can be held approximately constant over a long time period unless the oil passages 27c, 27d of the electromagnetic three-way valve 27 are communicated with each other in accordance with actuation of the clutch 16.

Further, arranged at a location close to the arm 28d is a clutch sensor 43. The clutch sensor 43 is formed e.g. by a proximity sensor, and delivers a clutch status signal (see FIGS. 11 and 12) to the MG•ECU 32. The clutch status signal indicates whether or not the arm 28d is in the position indicated by the two-dot chain line, that is, whether or not the clutch 16 is engaged.

The control system 1 includes an ENG•ECU 30 for mainly controlling the engine 3, a MOT•ECU 31 for mainly controlling the motor 5, the MG•ECU 32 for controlling the whole vehicle 2 including the engine 3 and the motor 5. Each of the three ECUs is formed by a microcomputer comprising a RAM, a ROM, a CPU, and an I/O interface, none of which are shown.

Further, each of the three ECUs is electrically connected to an auxiliary battery 33 via a power supply relay, not shown, and a self-holding relay, not shown, such that each ECU is driven by electric power supplied from the auxiliary battery 33. The supply of electric power from the auxiliary battery 33 to the ECUs 30 to 32 is started when an ignition switch (hereinafter referred to as "the IG•SW") 40 is turned on, and is stopped when the IG•SW 40 is turned off. More specifically, for instance, the MG•ECU 32 recognizes that the IG•SW 40 (start-detecting means) is turned off, and turns off the self-holding relay connecting between the same and the auxiliary battery 33, to thereby cut off the supply of electric power to the MG•ECU 32 itself. Further, the MG•ECU 32 is connected to the ENG•ECU 30 and the MOT•ECU 31.

The ENG•ECU 30 drives fuel injection valves, ignition plugs, etc. in response to signals (e.g. a signal indicative of an engine rotational speed NE) from various sensors, not shown, to thereby control the operation of the engine 3. For instance, when the IG•SW 40 is turned on, the ENG•ECU 30 starts the engine 3, whereas when the IG•SW 40 is turned off, the ENG•ECU 30 stops the engine 3.

The MOT•ECU 31 is connected to the motor 5 via a PDU 34 and a gate circuit 35. The PDU 34 is an electric circuit including an inverter, for instance, and is connected to the main battery 36. The MOT•ECU 31 controls the operation of the motor 5 via the PDU 34. More specifically, the MOT•ECU 31 controls the operation of the motor 5 by controlling power supply from the main battery 36 to the motor 5 according to a target motor driving force input from the MG•ECU 32, and controls regeneration of electric power by the motor 5.

Further, the gate circuit 35 is arranged between the PDU 34 and the motor 5, for selectively connecting and disconnecting the PDU 34 to and from the motor 5 in response to a control signal form the MG•ECU 32.

The MG•ECU 32 is connected to the electromagnetic three-way valve 27 and the electric oil pump 22 via the relay 37 and a relay 38, respectively. The relay 37 connects and disconnects the MG•ECU 32 to and from the electromagnetic three-way valve 27. When energized by a driving current from the MG•ECU 32, the relay 37 connects the MG•ECU 32 and the electromagnetic three-way valve 27 to each other, whereas when deenergized, the relay 37 disconnects them from each other.

Further, the relay 38 connects and disconnects the MG•ECU 32 to and from the electric oil pump 22. Similarly to the relay 37, when energized by a driving current from the MG•ECU 32, the relay 38 connects the MG•ECU 32 and the electric oil pump 22 to each other, whereas when deenergized, the relay 38 disconnects them from each other.

Further, connected to the MG•ECU 32 are the IG•SW 40, the pressure switch 41, both described above, wheel rotational speed sensors 42, the clutch sensor 43, described above, a resolver 44, respectively.

The wheel rotational speed sensors 42 are formed by four magnetic pickup type sensors (only one of which is shown) which are arranged at respective locations close to the front wheels 4, 4 and the rear wheels 6, 6. The wheel rotational speed sensors 42 deliver pulse signals indicative of the respective wheel rotational speeds to the MG•ECU 32.

Further, the resolver 44 delivers a signal dependent on a rotational angle position of the motor 5 to the MG•ECU 32.

The MG•ECU 32 (clutch-actuating means, control means, start-detecting means) controls the electric oil pump 22 and the motor 5 based on the signals from the switches 40, 41, and the sensors 42 to 44, as described hereinafter.

Figure 5:
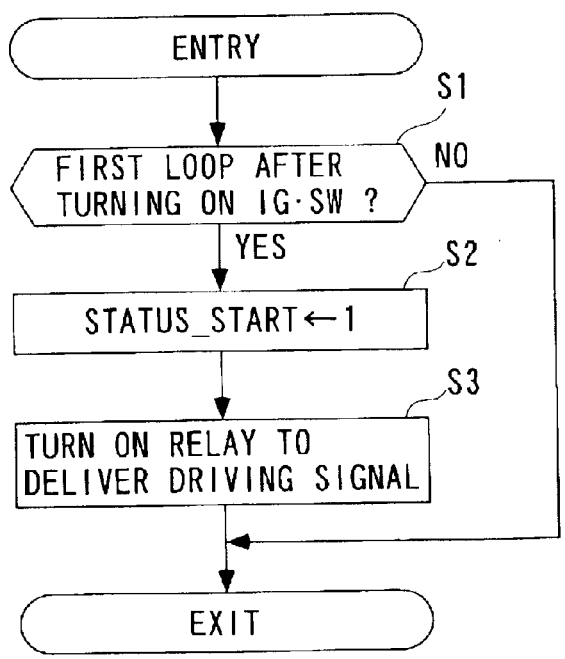
FIG. 5 is a flowchart showing a clutch engagement control process carried out in accordance with the turn-on of an IG·SW.

Next, a clutch engagement control process carried out by the MG•ECU 32 will be described with reference to FIG. 5. The MG•ECU 32 executes this process only immediately after the start of the engine 3.

In this process, first, in a step S1, it is determined whether or not the present loop is a first one after the IG•SW 40 has been turned on. If the answer to the question is negative (NO), the program is immediately terminated, whereas if the answer is affirmative (YES), i.e. if the present loop is being executed immediately after the IG•SW 40 has been turned on, the program proceeds to a step S2, wherein a start monitor STATUS_START is set to 1 to indicate this fact.

Then, the program proceeds to a step S3, wherein to engage the clutch 16 in accordance with the start of the engine 3, the relay 37 is turned on to thereby connect the MG•ECU 32 to the electromagnetic three-way valve 27, and a driving signal is delivered to the electromagnetic three-way valve 27, followed by terminating the program. As a result, the electromagnetic three-way valve 27 is turned on, and the accumulator pressure PAC is supplied to both of the oil chambers 28a, 28b of the hydraulic servo piston mechanism 28, whereby operation for engaging the clutch 16 is carried out. It should be noted that the start monitor STATUS_START is set to 0 through a process, not shown, in a predetermined timing after the clutch 16 has been engaged after the start of the engine 3.

Figure 6:
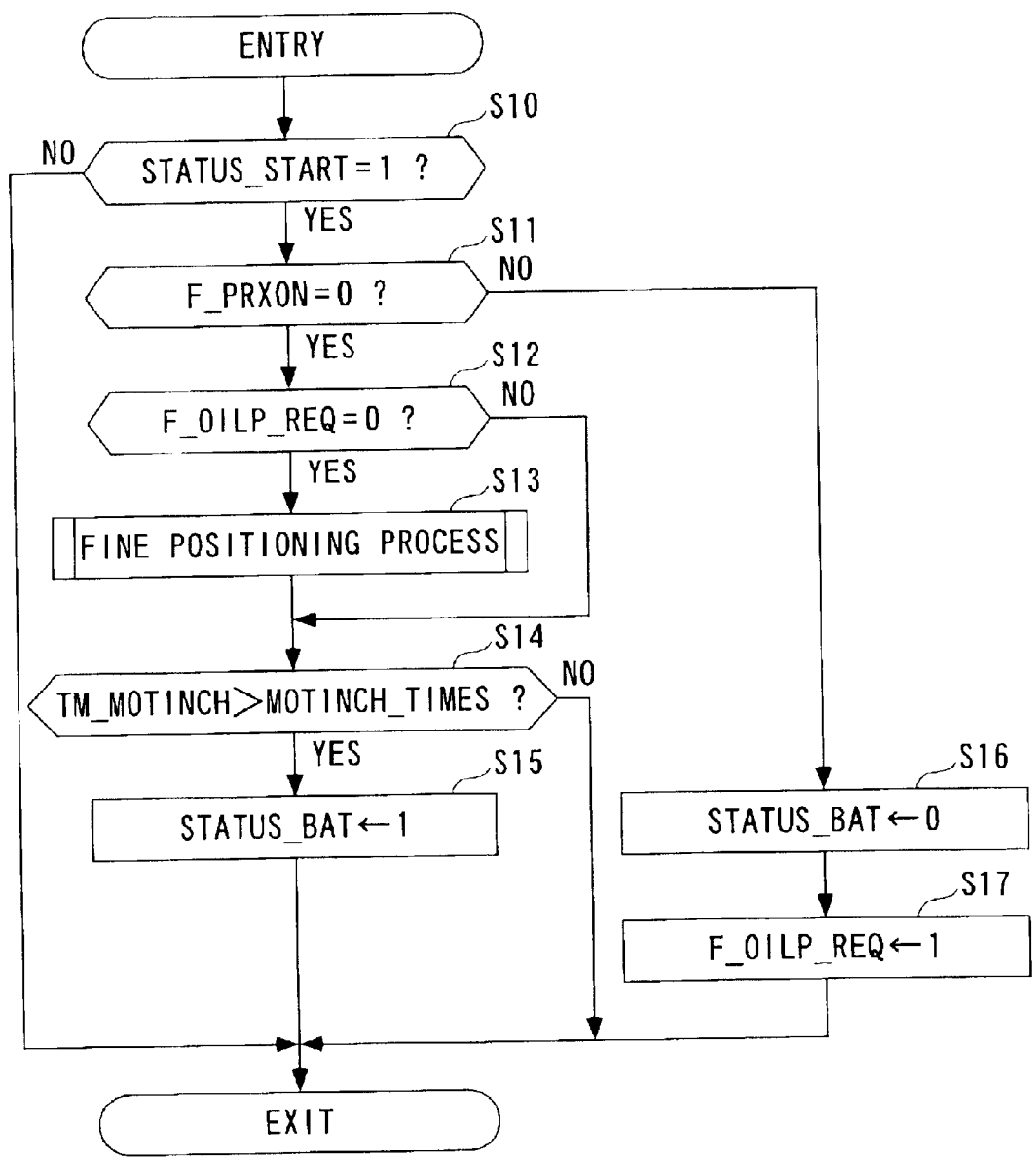
FIG. 6 is a flowchart showing a rear wheel-driving preparation-determining process carried out for determining whether or not preparation for driving the rear wheels has been completed.

Next, a rear wheel-driving preparation-determining process carried out by the MG•ECU 32 will be described with reference to FIG. 6. This process determines, when the engine 3 is started, whether or not preparation for driving the rear wheels 6 by the motor 5 has been completed, by determining whether or not the clutch 16 has been engaged. This process is executed at predetermined time intervals (e.g. of 10 msec.).

First, in a step S10, it is determined whether or not the start monitor STATUS_START assumes 1. If the answer to the question is negative (NO), i.e. if the engine 3 is not being started, the program is immediately terminated, whereas if the answer to the question is affirmative (YES), i.e. if the engine is being started, the program proceeds to a step S11, wherein it is determined whether or not a clutch engagement flag F_PRXON assumes 0.

The above clutch engagement flag F_PRXON is set to 1 when it is detected by the clutch sensor 43 that the clutch 16 is engaged, and set to 0 when it is not detected that the clutch 16 is engaged.

If the answer to the question of the step S11 is affirmative (YES), i.e. if the clutch 16 is disengaged, the program proceeds to a step S12, wherein it is determined whether or not a pump-driving request flag F_OILP_REQ assumes 0.

If the answer to the question of the step S12 is affirmative (YES), it is judged that the accumulator pressure PAC is high enough and it is not necessary to drive the electric oil pump 22, so that the program proceeds to a step S13, wherein a fine positioning process, referred to hereinafter, for positioning the motor 5 is carried out, followed by the program proceeding to a step S14. On the other hand, if the answer to the question of the step S12 is negative (NO), the program skips over the step S13 to the step S14.

In the step S14, it is determined whether or not a count TM_MOTINCH of an execution counter used in the above fine positioning process has exceeded a predetermined number MOTINCH_TIMES (three times, for instance). If the answer to the question is negative (NO), the program is immediately terminated, whereas if the answer is affirmative (YES), i.e. if the engagement of the clutch 16 cannot be confirmed even after the fine positioning process has been repeatedly carried out the predetermined number of times MOTINCH_TIMES, it is judged that preparation for driving the rear wheels 6 by the motor 5 has not yet been completed, and the program proceeds to a step S15, wherein an incomplete driving preparation monitor flag STATUS_BAT is set to 1 to indicate the fact, followed by terminating the program.

On the other hand, If the answer to the question of the step S11 is negative (NO), i.e. if the clutch 16 has been engaged, it is judged that preparation for driving the rear wheels 6 by the motor 5 has been completed, and the program proceeds to a step S16, wherein the incomplete driving preparation monitor flag STATUS_BAT is set to 0 to indicate the fact.

Then, the program proceeds to a step S17, wherein the pump-driving request flag F_OILP_REQ is set to 1 to indicate that it is necessary to drive the electric oil pump 22, followed by terminating the program. The pump-driving request flag F_OILP_REQ is set to 1, as described above, in order to secure a level of the accumulator pressure PAC high enough to reliably drive the clutch 16 after the engine 3 has been started by forcibly driving the electric oil pump 22 immediately after the clutch 16 has been engaged during the start of the engine 3.

Figure 7:
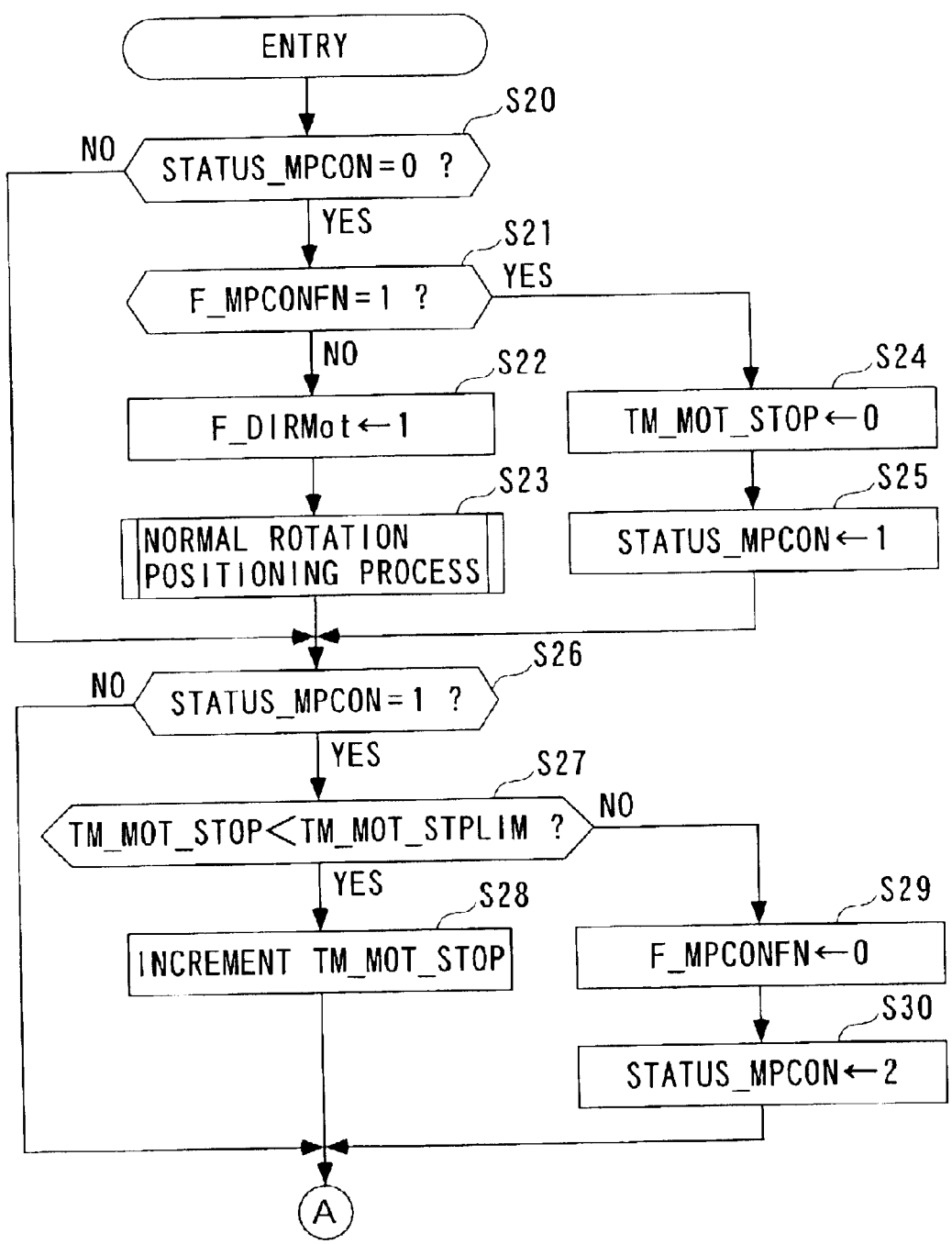
FIG. 7 is a flowchart showing a motor fine positioning process carried out in a step S13 in FIG. 6.

Next, the fine positioning process carried out in the step S13 in FIG. 6 for positioning the motor 5 will be described with reference to FIGS. 7 and 8. In this process, when the engine 3 is started, the motor 5 is rotated through a very small angle in the normal direction (in the direction of forward traveling of the vehicle 2) and in the reverse direction, and stopped (i.e. positioned) in a position to which the motor 5 has been rotated. This assists a clutch-engaging operation by the clutch-actuating mechanism 20, thereby making it possible to engage the clutch 16 more reliably.

First, in a step S20, it is determined whether or not a motor-driving monitor flag STATUS_MPCON assumes 0. If the answer to the question is negative (NO), the program skips over the following steps S21 to S25 to a step S26, referred to hereinafter. On the other hand, if the answer to the question is affirmative (YES), the program proceeds to the step S21, wherein it is determined whether or not a motor-positioning completion flag F_MPCONFN assumes 1. If the answer to the question is negative (NO), it is judged that a normal rotation positioning process for positioning the motor 5 should be carried out, and the program proceeds to the step S22, wherein a motor rotation direction flag F_DIRMot is set to 1 to indicate that the direction in which the motor 5 should be rotated is that of normal rotation thereof.

Then, the program proceeds to the step S23, wherein the normal rotation positioning process for positioning the motor 5 is executed, followed by the program proceeding to the step S26, referred to hereinbelow. In the normal rotation positioning process, the motor 5 is driven for normal rotation through a minimum rotational angle which can be detected by the resolver 44, and controlled such that the motor 5 is stopped in a position to which it has been rotated. Further, it is determined whether or not the normal rotation positioning process has been completed, and the value of the motor-positioning completion flag F_MPCONFN is set according to the result of the determination. More specifically, the motor-positioning completion flag F_MPCONFN is set to 1 when the positioning by the normal rotation positioning process has been completed, and set to 0 when the positioning has not yet been completed.

On the other hand, if the answer to the question of the step S21 is affirmative (YES), it is judged that the positioning by the normal rotation positioning process has been completed, and the program proceeds to the step 24, wherein the timer value TM_MOT_STP of a motor stop timer is cleared to 0.

Next, the program proceeds to the step S25, wherein the motor-driving monitor flag STATUS_MPCON is set to 1, followed by the program proceeding to the step S26. In the step S26, it is determined whether or not the motor-driving monitor flag STATUS_MPCON assumes 1. If the answer to the question is negative (NO), the program skips over the following steps S27 to S30 to a step S31, referred to hereinafter, in FIG. 8. On the other hand, if the answer to the question is affirmative (YES), the program proceeds to the step S27, wherein it is determined whether or not the timer value TM_MOT_STP of the motor stop timer is smaller than a predetermined threshold value TM_MOT_STPLIM.

If the answer to the question is affirmative (YES), the timer value TM_MOT_STP is incremented in the step S28, followed by the program proceeding to the step S31. On the other hand, if the answer to the question is negative (NO), it is judged that a time period long enough to place the motor 5 in a completely stopped state has elapsed after termination of the normal rotation positioning, and that a reverse rotation positioning process, referred to hereinafter, in a step S34 should be executed, and to indicate the fact, in the steps S29 and S30, the motor-positioning completion flag F_MPCONFN is set to 0, and the motor-driving monitor flag STATUS_MPCON is set to 2, respectively, followed by the program proceeding to the step S31 in FIG. 8.

Figure 8:
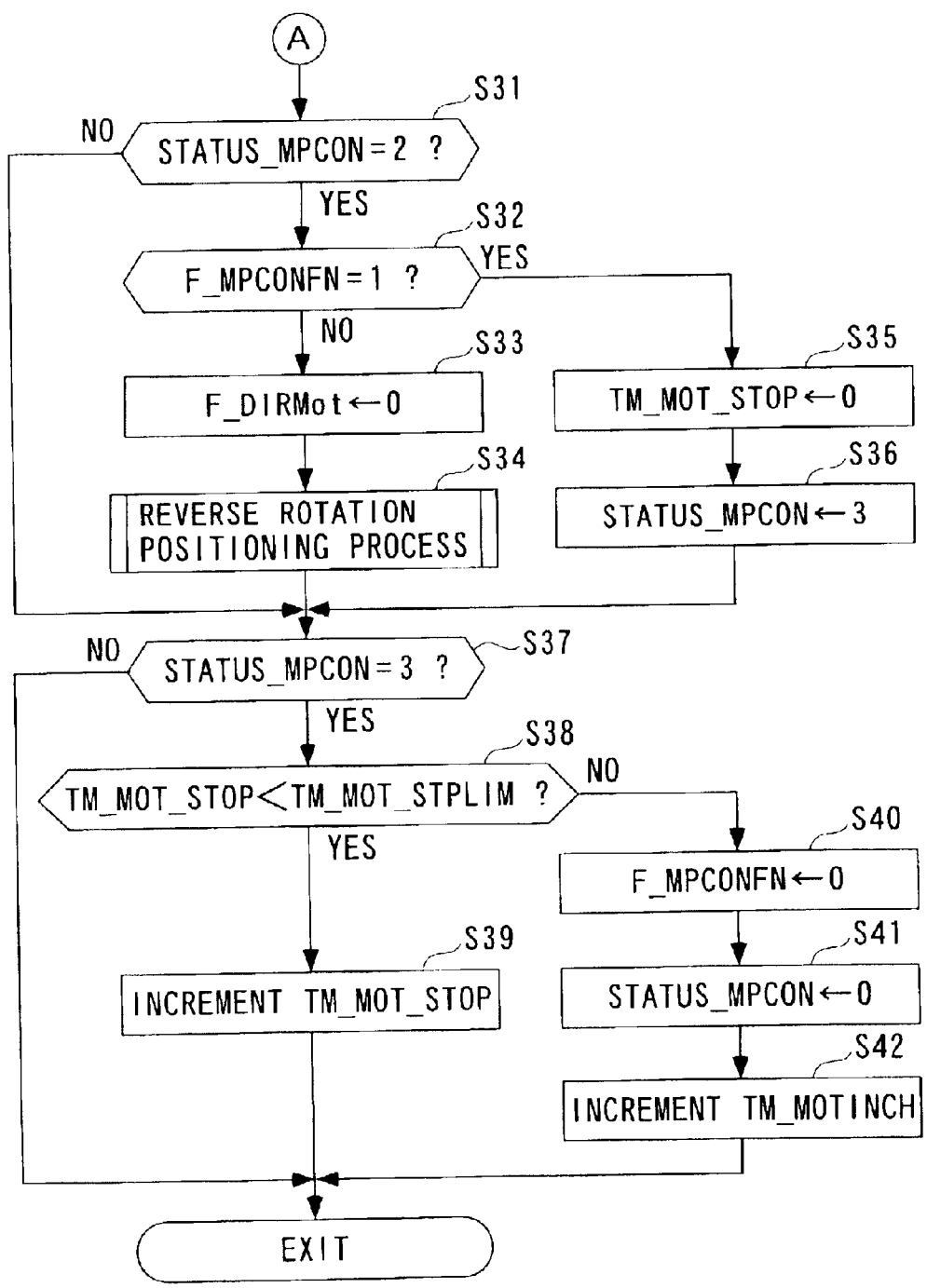
FIG. 8 is a continuation of the FIG. 7 flowchart.

In the step S31 in FIG. 8, it is determined whether or not the motor-driving monitor flag STATUS_MPCON assumes 2. If the answer to the question is negative (NO), the program skips over the following steps S32 to S36 to a step S37, referred to hereinafter. On the other hand, if the answer to the question is affirmative (YES), the program proceeds to the step S32, wherein it is determined whether or not the motor-positioning completion flag F_MPCONFN assumes 1. If the answer to the question is negative (NO), it is judged that conditions for executing the reverse rotation positioning process for positioning the motor 5 are satisfied, and the program proceeds to the step S33, wherein the motor rotation direction flag F_DIRMot is set to 0 to indicate that the direction in which the motor 5 should be rotated is that of reverse rotation thereof.

Then, the program proceeds to the step S34, wherein the reverse rotation positioning process for positioning the motor 5 is carried out, followed by the program proceeding to the step S37. In the reverse rotation positioning process, inversely to the above-mentioned normal rotation positioning process, the motor 5 is driven for reverse rotation through the minimum rotational angle which can be detected by the resolver 44, and controlled such that the motor 5 is stopped in a position to which it has been rotated. Further, similarly to the normal rotation positioning process, it is determine whether or not positioning by the reverse rotation positioning process has been completed, and the value of the motor-positioning completion flag F_MPCONFN is set according to the result of the determination. More specifically, the motor-positioning completion flag F_MPCONFN is set to 1 when the positioning has been completed, and set to 0 when the positioning has not yet been completed.

On the other hand, if the answer to the question of the step S32 is affirmative (YES), it is judged that the positioning by the reverse rotation positioning process has been completed, and the program proceeds to the step 35, wherein the timer value TM_MOT_STP of the motor stop timer is cleared to 0.

Next, the program proceeds to the step S36, wherein the motor-driving monitor flag STATUS_MPCON is set to 3 so as to indicate that the following steps S38 to S42 should be executed since the positioning by the reverse rotation positioning process has been completed. Then, the program proceeds to the step S37.

In the step S37, it is determined whether or not the motor-driving monitor flag STATUS_MPCON assumes 3. If the answer to the question is negative (NO), the program skips over the following steps S38 to S42, followed by terminating the program. On the other hand, if the answer to the question is affirmative (YES), the program proceeds to the step S38, wherein similarly to the step S27, it is determined whether or not the timer value TM_MOT_STP of the motor stop timer is smaller than the predetermined threshold value TM_MOT_STPLIM.

If the answer to the question is affirmative (YES), the program proceeds to the step S39, wherein similarly to the above step S28, the timer value TM_MOT_STP is incremented, followed by terminating the program. On the other hand, if the answer to the question is negative (NO), it is judged that the time period long enough to completely stop the motor 5 has elapsed after termination of the reverse rotation positioning in the step S34, and that conditions for executing the normal rotation positioning process in the step S23 are satisfied, and in the steps S40 and S41, the motor-positioning completion flag F_MPCONFN is set to 0, and the motor-driving monitor flag STATUS_MPCON is set to 0.

Then, the program proceeds to the step S42, wherein the count TM_MOTINCH of the execution counter used in the fine positioning process for positioning the motor 5 is incremented, followed by terminating the program.

Figure 9:
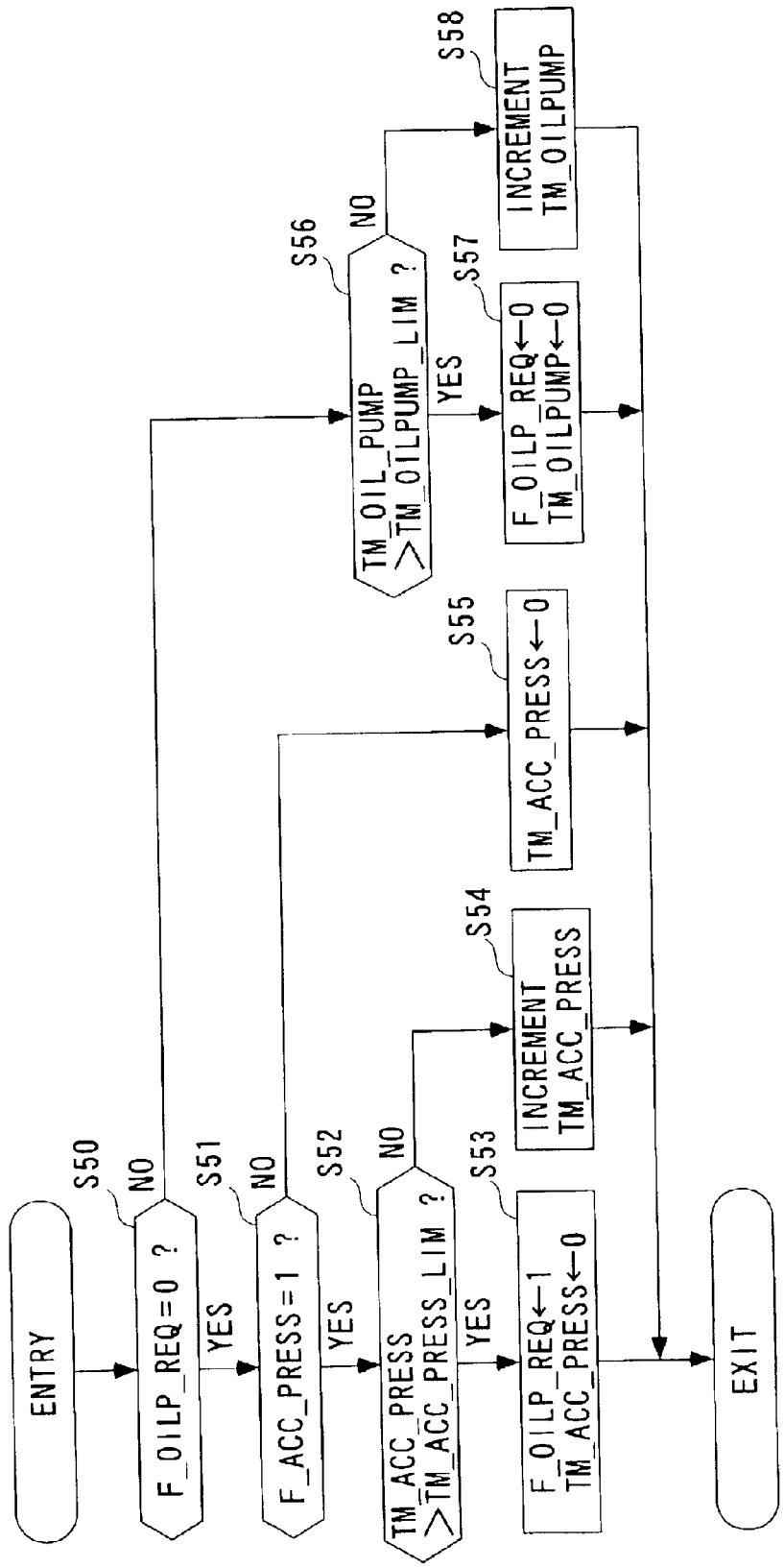
FIG. 9 is a flowchart showing a checking process for checking an accumulator pressure, as part of an accumulator control process.
Figure 10:
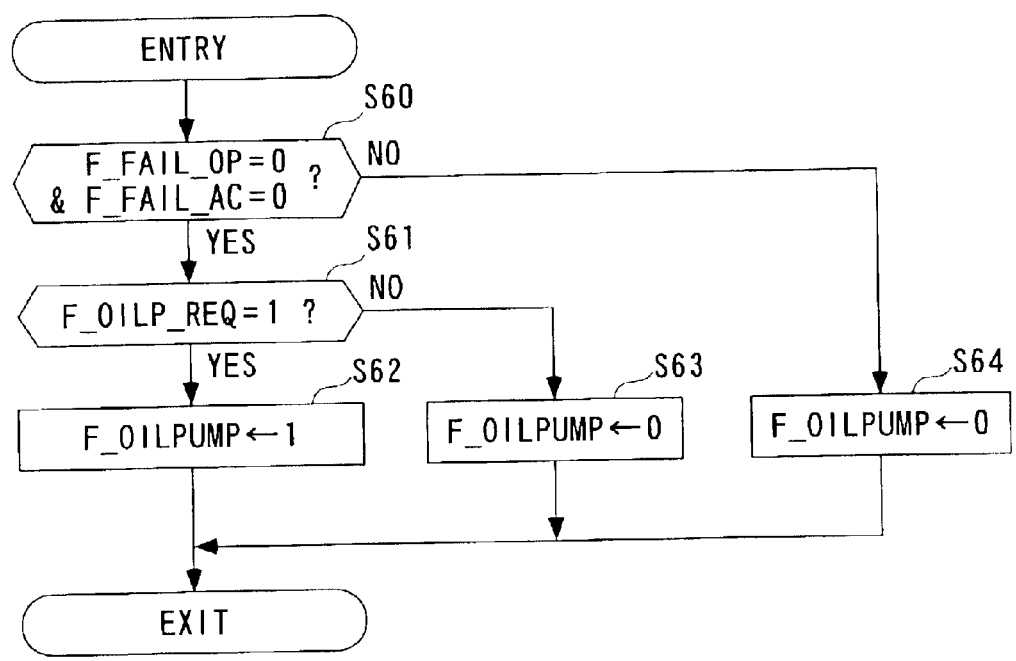
FIG. 10 is a flowchart showing an accumulating process for accumulating pressure in an accumulator, as part of the accumulator control process.

Next, a control process for controlling the accumulator 23 will be described with reference to FIGS. 9 and 10. FIG. 9 shows a checking process for checking the accumulator pressure PAC, as part of the control process for controlling the accumulator 23, while FIG. 10 shows a pressure-accumulating process for accumulating pressure in the accumulator 23, as part of the same.

First, the FIG. 9 checking process for checking the accumulator pressure PAC is described. This process is carried out at predetermined time intervals (e.g. of 10 msec.) so long as the MG•ECU 32 is on.

In the checking process, first, in a step S50, it is determined whether or not the pump-driving request flag F_OILP_REQ assumes 0. If the answer to the question is affirmative (YES), since the driving of the electric oil pump 22 is not requested, it is judged that the electric oil pump 22 is in stoppage, and the program proceeds to a step S51, wherein it is determined whether or not an accumulator pressure flag F_ACC_PRESS assumes 1.

The accumulator pressure flag F_ACC_PRESS is set to 1 when the accumulator pressure PAC is equal to or lower than the operating pressure PACREF and hence the switch 41 is turned off, whereas when the accumulator pressure PAC is higher than the operating pressure PACREF, the accumulator pressure flag F_ACC_PRESS is set to 0.

If the answer to the question of the step S51 is affirmative (YES), i.e. if the accumulator pressure PAC is equal to or lower than the operating pressure PACREF, the program proceeds to a step S52, wherein it is determined whether or not a count TM_ACC_PRESS of a low pressure counter has exceeded a predetermined number of times TM_ACC_PRESS_LIM. If the answer to the question is negative (NO), the program proceeds to a step S54, wherein the count TM_ACC_PRESS of the low pressure counter is incremented, followed by terminating the program.

On the other hand, if the answer to the question of the step S52 is affirmative (YES), i.e. if the number of times that the accumulator pressure PAC was equal to or lower than the operating pressure PACREF has exceeded the predetermined number of times TM_ACC_PRESS_LIM, it is judged that operation for accumulating pressure in the accumulator 23 need be carried out by the electric oil pump 22, and the program proceeds to a step S53, wherein the pump-driving request flag F_OILP_REQ is set to 1 to indicate the fact, and at the same time the count TM_ACC_PRESS of the low pressure counter is cleared to 0.

On the other hand, if the answer to the question of the step S51 is negative (NO), i.e. if the accumulator pressure PAC is higher than the operating pressure PACREF, the program proceeds to a step S55, wherein the count TM_ACC_PRESS of the low pressure counter is cleared to 0, followed by terminating the program.

Further, if the answer to the question of the step S50 is negative (NO), i.e. if driving of the electric oil pump 22 is demanded, the program proceeds to a step S56, wherein it is determined whether or not a timer value TM_OIL_PUMP of a pressure accumulation wait timer is larger than a predetermined threshold value TM_OIL_PUMP_LIM.

If the answer to the question is negative (NO), it is judged that accumulation of oil pressure in the accumulator 23 has not yet been completed, and the program proceeds to a step S58, wherein the timer value TM_OIL_PUMP of the pressure accumulation wait timer is incremented, followed by terminating the program.

On the other hand, if the answer to the question of the step S56 is affirmative (YES), it is judged that the accumulation of oil pressure in the accumulator 23 has been completed by driving the electric oil pump 22, so that the program proceeds to a step S57, wherein the pump-driving request flag F_OILP_REQ is set to 0 to indicate the fact, and at the same time the timer value TM_OIL_PUMP of the pressure accumulation wait timer is cleared to 0, followed by terminating the program.

As described above, in the present embodiment, if the number of times that the accumulator pressure flag F_ACC_PRESS assumed 1, that is, the number of times that the accumulator pressure PAC was equal to or lower than the operating pressure PACREF has exceeded the predetermined number of times TM_ACC_PRESS_LIM, the operation for accumulating pressure in the accumulator 23 is carried out by the electric oil pump 22. This is for reliably determining whether or not the accumulator pressure PAC has been lowered, as well as for securing stability in control of the accumulator 23.

Next, the FIG. 10 pressure-accumulating process for accumulating pressure in the accumulator 23 is described. This process is carried out at predetermined time intervals (e.g. of 10 msec.) so long as the MG•ECU 32 is on.

In this process, first, in a step S60, it is determined whether or not both of a pump fail flag F_FAIL_OP and an accumulator fail flag F_FAIL_AC assume 0. The pump fail flag F_FAIL_OP is set to 1 when a failure has been detected in the electric oil pump 22 and to 0 when no failure has been detected in the electric oil pump 22, by a failure-detecting process, not shown. Similarly, the accumulator fail flag F_FAIL_AC is also set to 1 when a failure has been detected in the accumulator 23, and to 0 when no failure has been detected in the accumulator 23.

If the answer to the question of the step S60 is affirmative (YES), it is judged that the electric oil pump 22 and the accumulator 23 are both normally operating, and the program proceeds to a step S61, wherein it is determined whether or not the pump-driving request flag F_OILP_REQ assumes 1.

If the answer to this question is affirmative (YES), it is judged that the electric oil pump 22 and the accumulator 23 are both normally operating, and at the same time that the electric oil pump 22 should be driven due to lowering of the accumulator pressure PAC, so that the program proceeds to a step S62, wherein a pump drive flag F_OILPUMP is set to 1 to indicate the fact, followed by terminating the program. According to the setting of the pump drive flag F_OILPUMP, by carrying out a control process, not shown, the relay 38 is turned on to connect the electric oil pump 22 to the MG•ECU 32, and the driving signal is delivered to the electric oil pump 22 to drive the same. This causes oil pressure increased by the electric oil pump 22 to be accumulated in the accumulator 23.

On the other hand, if the answer to the question of the step S61 is negative (NO), it is judged that the accumulator pressure PAC is higher than the operating pressure PACREF and there is no need to drive the electric oil pump 22, so that the program proceeds to a step S63, wherein the pump drive flag F_OILPUMP is set to 0 to indicate the fact, followed by terminating the program. By carrying out the control process, not shown, the relay 38 is turned off to disconnect the electric oil pump 22 from the MG•ECU 32, whereby the electric oil pump 22 is held in a stopped state.

If the answer to the question of the step S60 is negative (NO), it is judged that the electric oil pump 22 should not be driven since there is a fail in at least one of the electric oil pump 22 and the accumulator 23, so that the program proceeds to a step S64, wherein the pump drive flag F_OILPUMP is set to 0 to indicate the fact, followed by terminating the program. As a result, similarly to the step S61, the electric oil pump 22 is held in a stopped state.

Figure 12:
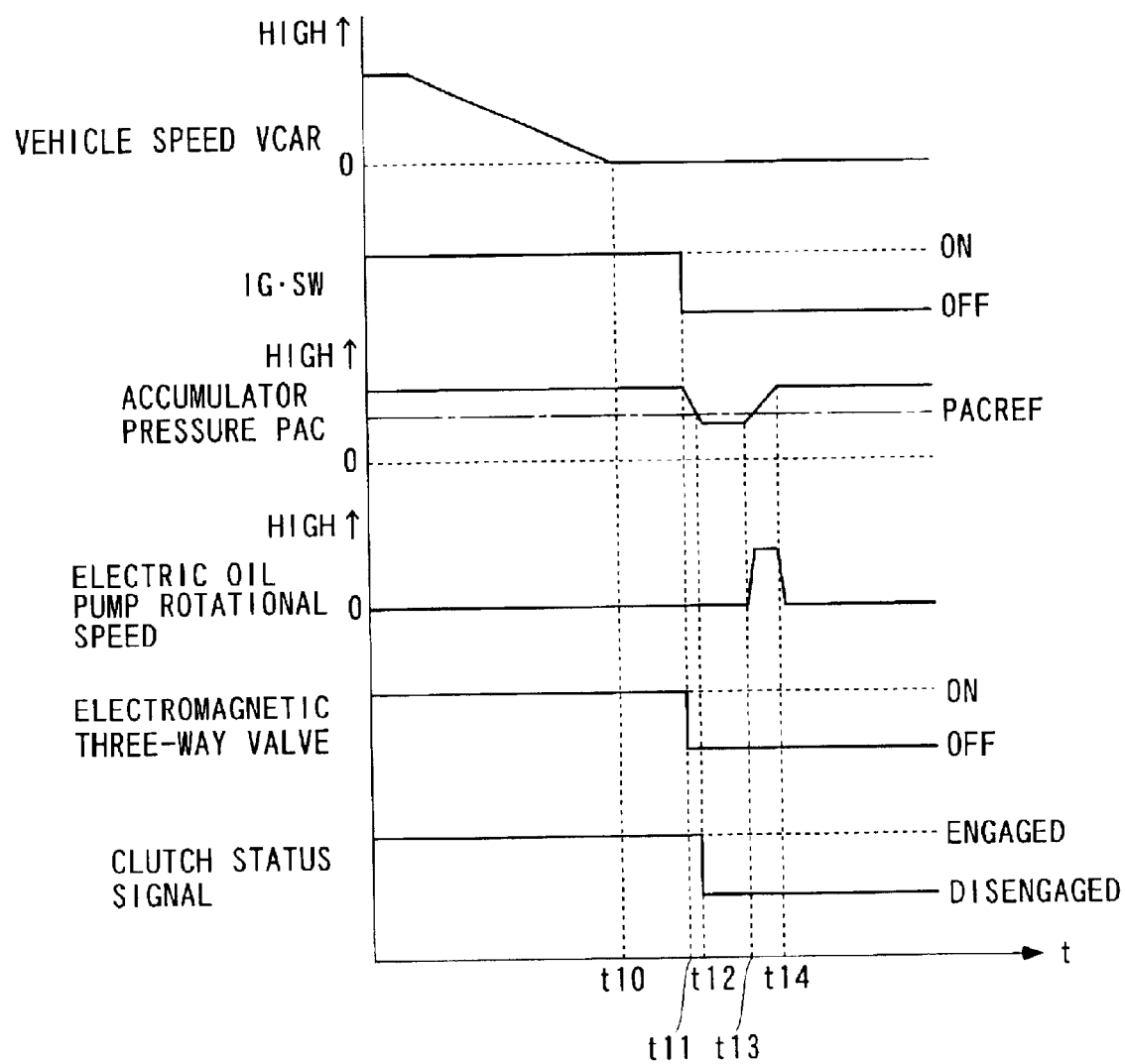
FIG. 12 is a timing chart showing an example of a vehicle stop operation.

FIG. 11 and FIG. 12 show respective examples of operations of the vehicle 2 controlled by the above control processes, at the start and the stop of the vehicle 2.

Referring to FIG. 11, when the vehicle 2 is standing and hence a vehicle speed VCAR is zero, if the IG•SW 40 is turned on at a time t1, the relay 37 is turned on simultaneously, and at the same time the driving signal is delivered to the electromagnetic three-way valve 27, whereby the electromagnetic three-way valve 27 is turned on. As a result, the accumulator pressure PAC is supplied to the hydraulic servo piston mechanism 28 via the electromagnetic three-way valve 27, and becomes lower. Then, at a time t2 when the number of times that the accumulator pressure PAC was equal to or lower than the operating pressure PACREF has exceeded the predetermined number of times TM_ACC_PRESS_LIM, the electric oil pump 22 is driven to increase the rotational speed thereof. Then, when the timer value TM_OIL_PUMP of the pressure accumulation wait timer has become larger than the predetermined threshold value TM_OIL_PUMP_LIM, in other words, at a time t3 when the accumulation of oil pressure in the accumulator 23 has been completed, the electric oil pump 22 is stopped.

After that, the clutch is engaged at a time t4, whereby the accumulator pressure PAC is consumed to be made lower than the operating pressure PACREF. Then, similarly to the above, at a time t5 when the number of times that the accumulator pressure PAC was equal to or lower than the operating pressure PACREF has exceeded the predetermined number of times, the electric oil pump 22 is driven again to increase the rotational speed thereof. Thereafter, similarly to the above, at a time t6 when the accumulation of oil pressure in the accumulator 23 has been completed, the electric oil pump 22 is stopped.

Further, as shown in FIG. 12, after the vehicle speed VCAR has been lowered until the vehicle comes to a stop at a time t10, when the IG•SW 40 is turned off at a time t11, simultaneously to the turning off of the IG•SW 40, the output of the driving signal to the electromagnetic three-way valve 27 is stopped and the electromagnetic three-way valve 27 is turned off. The clutch 16 is disengaged at a time t12 slightly delayed from the time point of the turning off the electromagnetic three-way valve 27. To disengage the clutch 16, the accumulator pressure PAC is supplied to the hydraulic servo piston mechanism 28, and reduced to a level equal to or lower than the operating pressure PACREF. Then, similarly to the case of FIG. 11, when the number of times that the accumulator pressure PAC was equal to or lower than the operating pressure PACREF has exceeded the predetermined number of times, i.e. at a time t13, the electric oil pump 22 is driven again to increase the rotational speed thereof. The accumulator pressure PAC is increased with the increase of the rotational speed of the pump 22. Then, at a time t14 when the accumulation of oil pressure in the accumulator 23 is completed, the electric oil pump 22 is stopped.

As described hereinbefore, according to the control system of the first embodiment, the electric oil pump 22 is driven when the accumulator pressure PAC is equal to or lower than the operating pressure PACREF, whereby the accumulator pressure PAC is increased, and the clutch 16 is actuated by the accumulator pressure PAC increased as above. This causes the rear wheels 6 and the motor 5 to be connected to or disconnected from each other. As described above, by driving the electric oil pump 22, the accumulator pressure PAC can be reliably held in a state capable of engaging or disengaging the clutch 16, irrespective of a traveling state of the vehicle 2, which enable the clutch 16 to be engaged or disengaged promptly and reliably. As a result, it is possible to drive the rear wheels 6 by the motor 5 promptly and reliably as required, thereby ensuring a sufficient total driving force for the vehicle to enhance the marketability of the vehicle 2.

Further, when the engine 3 is started, if the clutch 16 has been disengaged, it is engaged by the accumulator pressure PAC. In this process, when the accumulator pressure PAC is equal to or lower than the operating pressure PACREF, the pressure of the accumulator 23 is increased by the electric oil pump 22. Therefore, during the start of the engine 3, even when the accumulator pressure PAC is low, the clutch 16 is engaged reliably and promptly by promptly increasing the accumulator pressure PAC. Therefore, it is possible to drive the rear wheels 6 by the motor 5 reliably and promptly. This makes it possible to ensure an excellent startability of the vehicle 2 even on a road having a small surface resistance, thereby further enhancing the marketability of the vehicle 2.

Next, a control system for a front-and-rear wheel drive vehicle, according to a second embodiment of the invention will be described with reference to FIGS. 13 to 20. The vehicle 2 to which is applied the control system 1 according to the second embodiment is distinguished from the vehicle 2 to which is applied the control system 1 according to the first embodiment only in part thereof. Therefore, in the following description, only points different in configuration from those of the first embodiment are described, while designating component parts and elements similar to those of the first embodiment by identical reference numerals, and omitting detailed description thereof.

Figure 13:
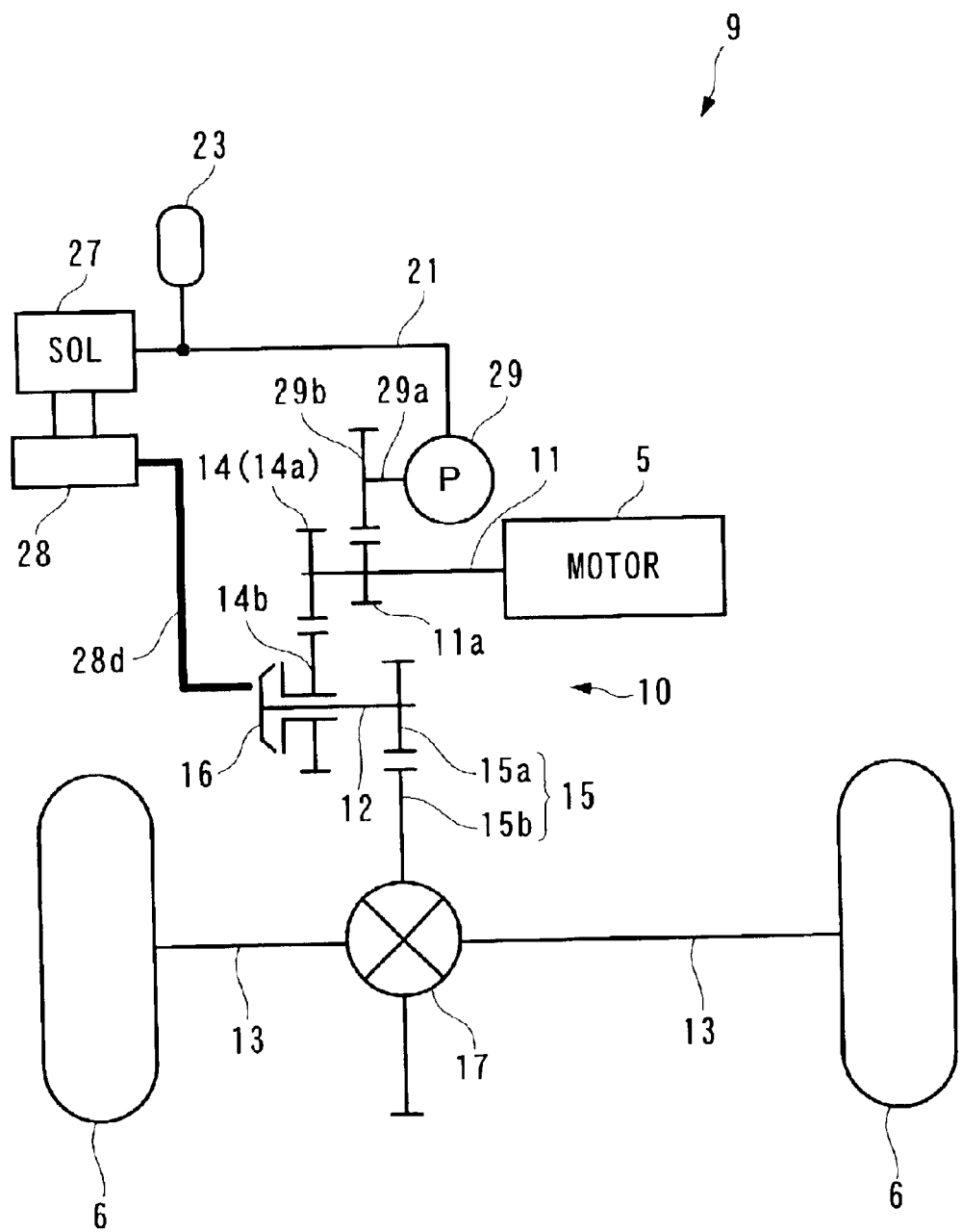
FIG. 13 is a block diagram schematically showing the arrangement of a rear wheel-driving mechanism for a front-and-rear wheel drive vehicle incorporating a control system according to a second embodiment.

Referring to FIG. 13, the vehicle 2 according to the present embodiment is distinguished from the vehicle 2 according to the first embodiment only in that it includes a mechanical oil pump 29 (pump) in place of the electric oil pump 22 in the first embodiment. Similarly to the above-mentioned oil pump 22A of the electric oil pump 22, the oil pump 29 is a gear pump device containing two gears, not shown, meshed with each other. One of the gears is coaxially and integrally formed with a pump shaft 29a.

The pump shaft 29a has a driven gear 29b integrally formed therewith. Further, the output shaft 11 has a pump-driving gear 11a integrally formed therewith on the motor side of the reduction gear 14a. The pump-driving gear 11a is always meshed with the driven gear 29b. Consequently, the oil pump 29 has the two gears driven in respective directions indicated by the arrows in FIG. 3 in accordance with the normal rotation (rotation in the direction of forward traveling of the vehicle 2) of the motor 5 (pump-driving means), whereby oil pressure increased by the oil pump 29 is supplied to the accumulator 23.

Further, as described hereinbefore, when the motor 5 rotates in the reverse direction, the oil pump 29 returns oil on the discharge side thereof to the suction oil passage 21a without supplying oil pressure to the accumulator 23. As described above, in this process, oil pressure on the side of the suction oil passage 21a is prevented from being excessively increased.

Next, a control process carried out by the MG•ECU 32 for the control system 1 according to the present embodiment will be described with reference to FIGS. 14 to 20. In comparison with the above-mentioned control process executed by the control system according to the first embodiment, the control process executed by the control system according to the present embodiment is distinguished only in that the control of the motor 5 is carried out so as to control accumulation of oil pressure in the accumulator 23 by the oil pump 29, in place of the control of the electric oil pump 22 in the first embodiment. It should be noted that although most of steps in flowcharts shown FIGS. 14 to 18 are identical to those of corresponding flowcharts in the first embodiment, they are all renumbered. The correspondence and difference between them will be clearly understood by the following description as well.

Figure 14:
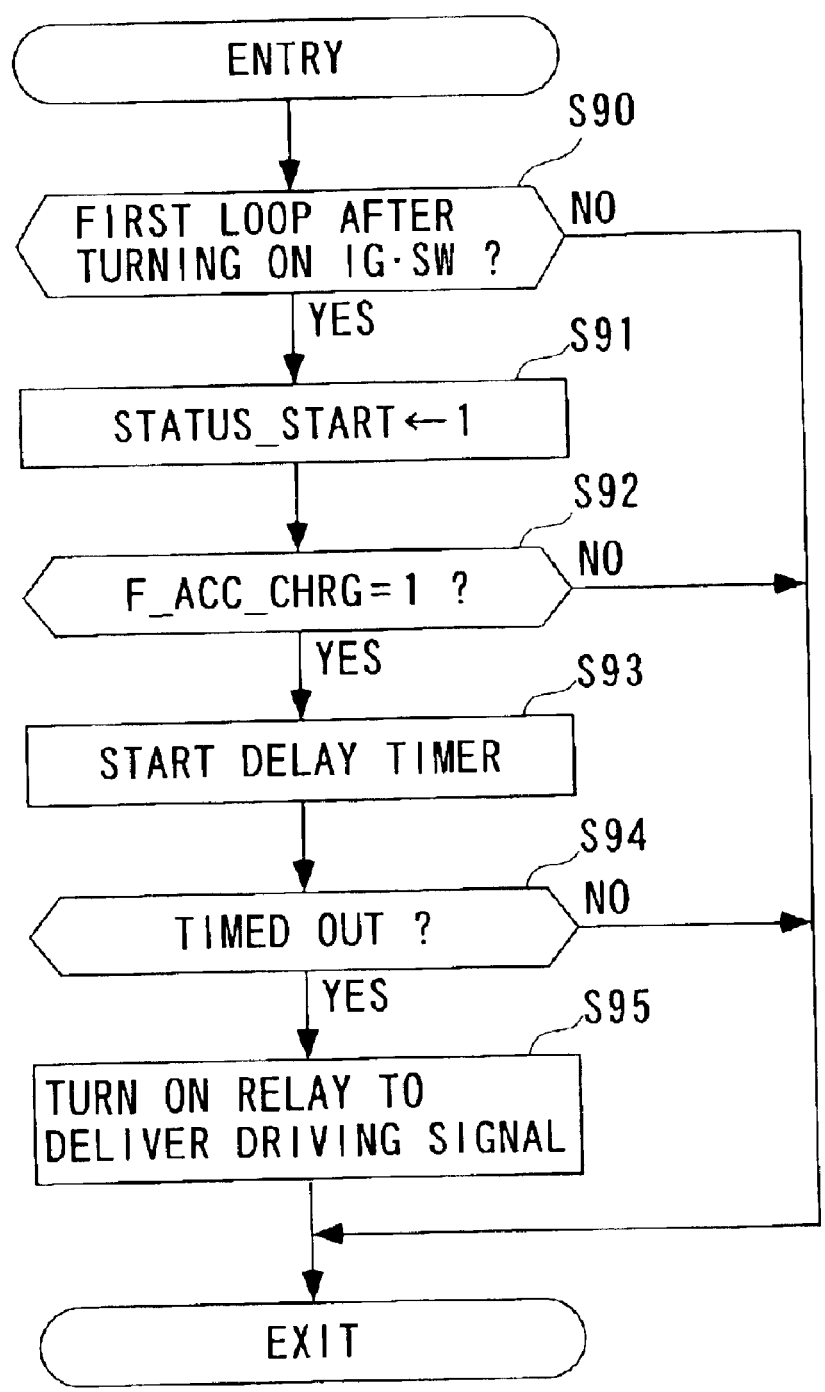
FIG. 14 is a flowchart showing a clutch engagement control process, which is carried out by the control system according to the second embodiment in accordance with the turn-on of the IG·SW.

First of all, a clutch-engaging process which is carried out by the MG•ECU 32 after the IG•SW 40 is turned on will be described with reference to FIG. 14. This process is distinguished from the FIG. 5 process, described above, only in that it has steps S92 to S94 added thereto.

In the step S92, it is determined whether or not an accumulator pressure accumulation completion flag F_ACC_CHRG assumes 1. As will be described in detail hereinafter, the accumulator pressure accumulation completion flag F_ACC_CHRG is set to 1 when the accumulator pressure PAC is higher than the operating pressure PACREF in a FIG. 16 checking process for checking the accumulator pressure PAC, and set to 0 in a system initialization process, not shown, which is executed prior to all the processes to be executed after the IG•SW 40 is turned on.

If the answer to the question is negative (NO), the program is immediately terminated, whereas if the answer is affirmative (YES), the program proceeds to the step S93, wherein a delay timer of count-up type is started. This delay timer is used for measuring a time period from a time point of completing accumulation of oil pressure in the accumulator 23 to a time point of completely stopping the motor 5.

Then, the program proceeds to the step S94, wherein it is determined whether or not the delay timer has timed out. If the answer to the question is negative (NO), the program is immediately terminated, whereas if the answer is affirmative (YES), it is judged that the motor 5 is completely stopped after the accumulator pressure PAC is increased up to a pressure equal to or higher than the operating pressure PACREF, so that the program proceeds to a step S95, wherein similarly to the above step S3, the clutch-engaging operation is carried out.

As described above, in the present embodiment, the clutch-engaging operation is not executed until the motor 5 is completely stopped after the accumulator pressure PAC is increased up to a pressure equal to or higher than the operating pressure PACREF.

Figure 15:
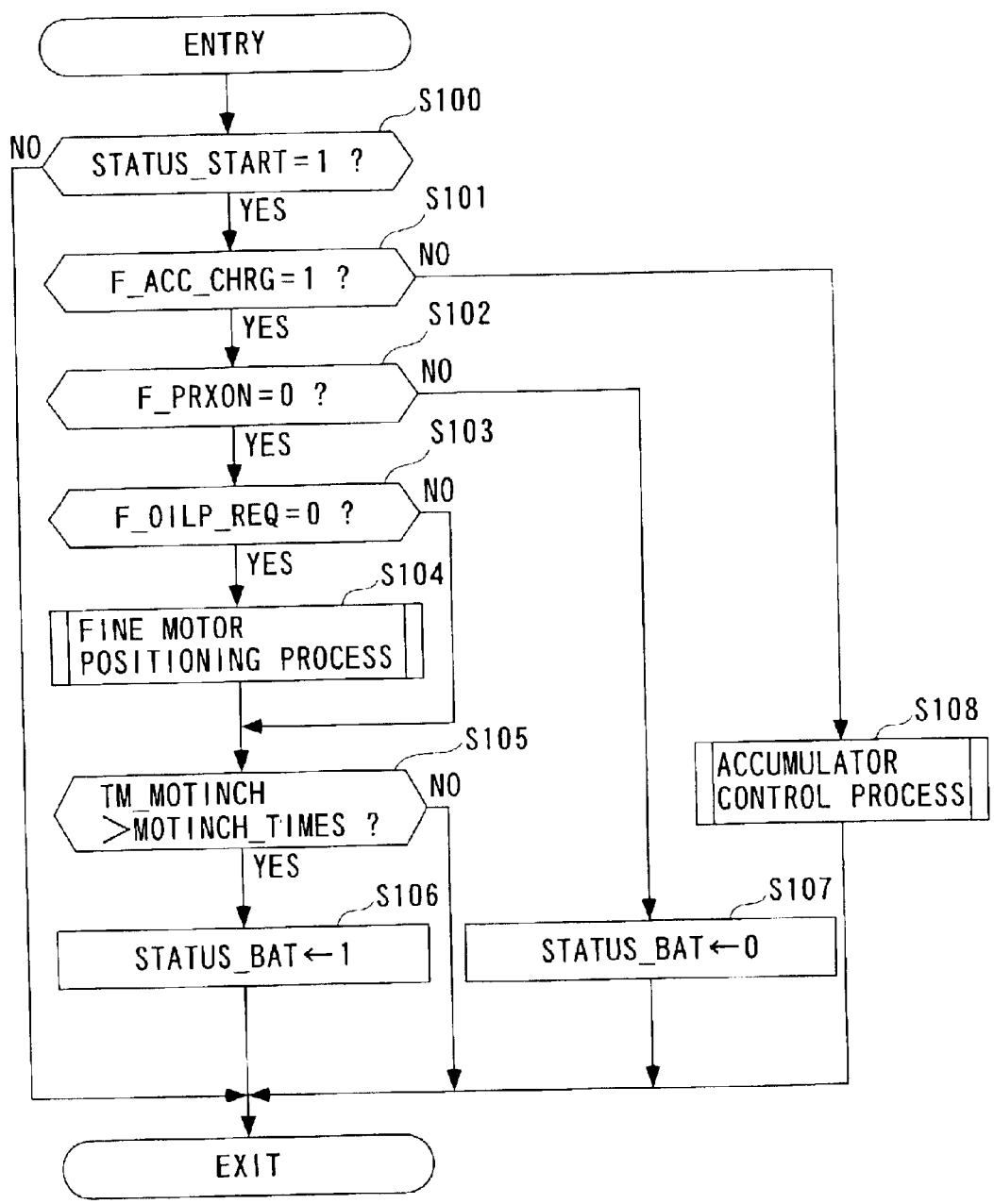
FIG. 15 is a flowchart showing a rear wheel-driving preparation-determining process for determining whether or not preparation for driving the rear wheels has been completed, which is carried out by the control system according to the second embodiment.

Next, a rear wheel-driving preparation-determining process shown in FIG. 15 will be described. As shown in the figure, this process is distinguished from the FIG. 6 process, described above, only in steps S101 and S108. In the step S101, it is determined whether or not the accumulator pressure accumulation completion flag F_ACC_CHRG assumes 1. If the answer to the question is negative (NO), the program proceeds to the step S108, wherein an accumulator control process, described hereinafter, is carried out. On the other hand, if the answer to the question of the step S101 is affirmative (YES), similarly to the FIG. 6 process, processes in steps S102 to S107 are carried out.

Next, the accumulator control process carried out in the step S108 will be described. In this process, a checking process, shown in FIG. 16, for checking the accumulator pressure PAC, and a pressure-accumulating process, shown in FIG. 17, for accumulating oil pressure in the accumulator 23 are carried out.

Figure 16:
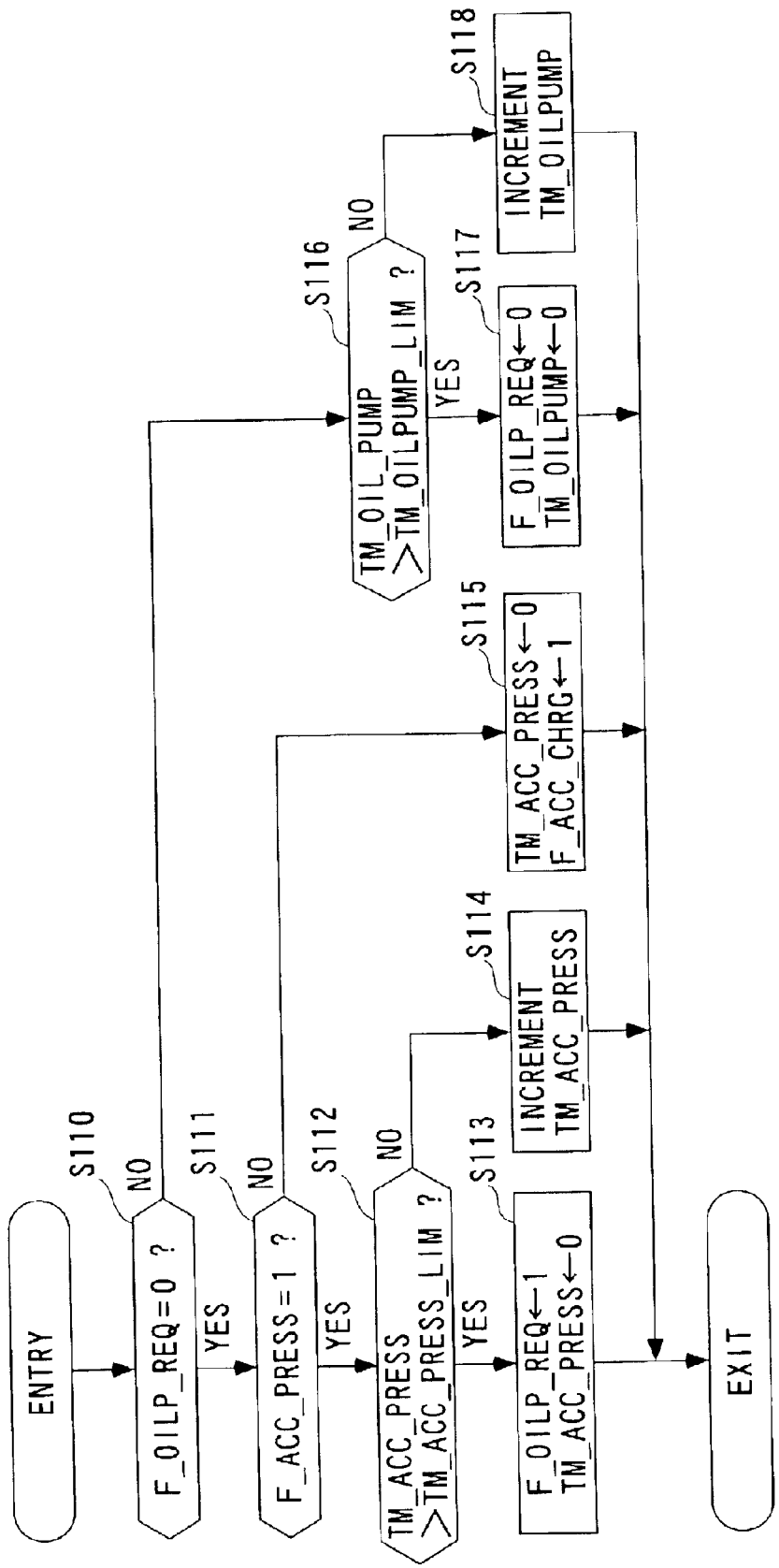
FIG. 16 is a flowchart showing a checking process for checking an accumulator pressure, as part of an accumulator control process carried out by the control system according to the second embodiment.

First, the FIG. 16 checking process for checking the accumulator pressure PAC is described. As shown in FIG. 16, this process is distinguished from the FIG. 9 process, described above, only in a step S115 which is performed if the answer to the question of a step S111 is negative (NO), i.e. if the accumulator pressure PAC is higher than the operating pressure PACREF. More specifically, in the step S115, similarly to the step S55 in FIG. 9, the count TM_ACC_PRESS of the low pressure counter is cleared to 0, and further the accumulator pressure accumulation completion flag F_ACC_CHRG is set to 1. This makes the answers to the questions of the steps S92 and S101 affirmative (YES).

Figure 17:
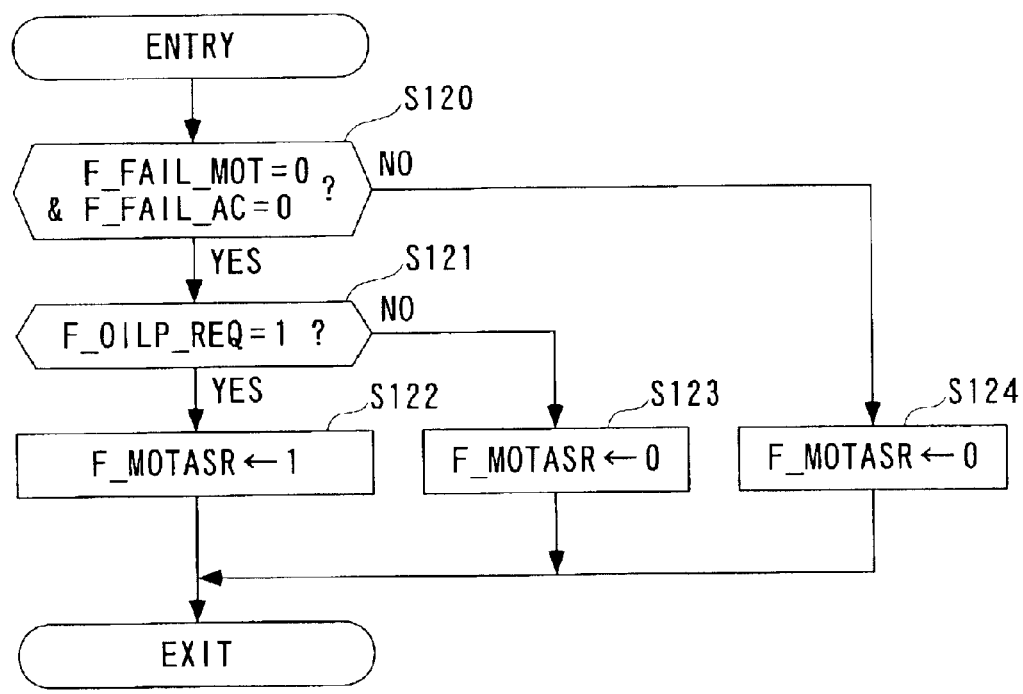
FIG. 17 is a flowchart showing an accumulating process for accumulating pressure in an accumulator, as part of the accumulator control process.

Next, the FIG. 17 pressure-accumulating process for accumulating oil pressure in the accumulator 23 will be described. As shown in FIG. 17, this process is distinguished from the FIG. 10 process in that it is determined in a step S120 whether or not a motor fail flag F_FAIL_MOT assumes 0 instead of determining whether or not the pump fail flag F_FAIL_OP assumes 0, and in that the value of a motor-driving flag F_MOTASR is set in steps S122 to S124 instead of setting the value of the pump drive flag F_OILPUMP.

The above motor fail flag F_FAIL_MOT is set to 1 when a failure has been detected in the motor 5, and to 0 when no failure has been detected in the motor 5, by carrying out a failure-detecting process, not shown. Therefore, in the step S120, it is determined whether or not both of the motor 5 and the accumulator 23 are normally operating.

Further, the motor-driving flag F_MOTASR is set to 1 in the step S122 if the answer to the question of the step S120 is affirmative (YES), and at the same time if an answer to the question of a step S121 is affirmative (YES), i.e. if the motor 5 need be driven to accumulate oil pressure in the accumulator 23. On the other hand, if the answer to the question of the step S121 is negative (NO), i.e. if the motor 5 need not be driven, the motor-driving flag F_MOTASR is set to 0 in the step S123 or if the answer to the question of the step S120 is negative (NO), i.e. if the motor 5 should not be driven, the motor-driving flag F_MOTASR is set to 0 in the step S124. As described above, if the motor-driving flag F_MOTASR has been set to 1, the motor 5 is driven by carrying out a process, not shown, whereby the oil pump 29 is driven. This causes oil pressure increased by the oil pump 29 to be accumulated in the accumulator 23.

Figure 18:
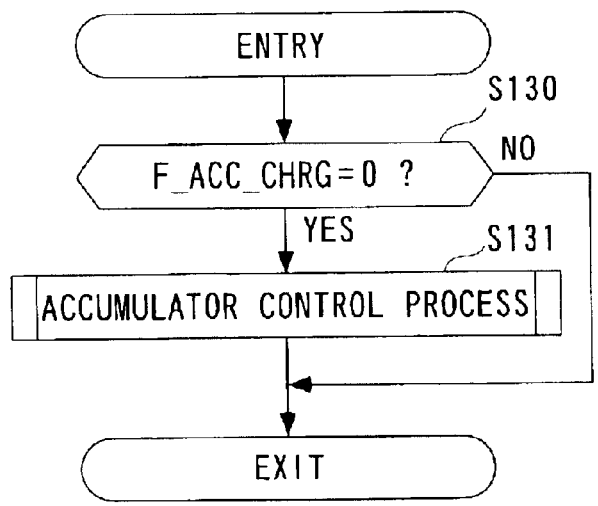
FIG. 18 is a flowchart showing the accumulator control process carried out during stoppage of an engine.

Next, an accumulator control process carried out during when the engine 3 is stopped will be described with reference to FIG. 18. This process is continuously carried out for a predetermined time period (e.g. 3 seconds) at predetermined time intervals (e.g. of 10 msec.) after the IG•SW 40 is turned off. It should be noted that after continuously carrying out the process for the predetermined time period, the MG•ECU 32 turns off the self-holding relay to thereby place itself in the OFF state.

In the accumulator control process, first, in a step S130, it is determined whether or not the accumulator pressure accumulation completion flag F_ACC_CHRG assumes 0. If the answer to the question is negative (NO), it is judged that there is no need to perform accumulation of oil pressure in the accumulator 23, so that the program is immediately terminated.

On the other hand, if the answer to the question is affirmative (YES), it is judged that oil pressure is required to be accumulated in the accumulator 23, and the program proceeds to a step S131, wherein similarly to the step S108, described hereinabove, the accumulator control process is carried out, followed by terminating the program. More specifically, in this accumulator control process, the FIG. 16 checking process for checking the accumulator pressure PAC, and the FIG. 17 pressure-accumulating process for accumulating oil pressure in the accumulator 23 are carried out.

Figure 19:
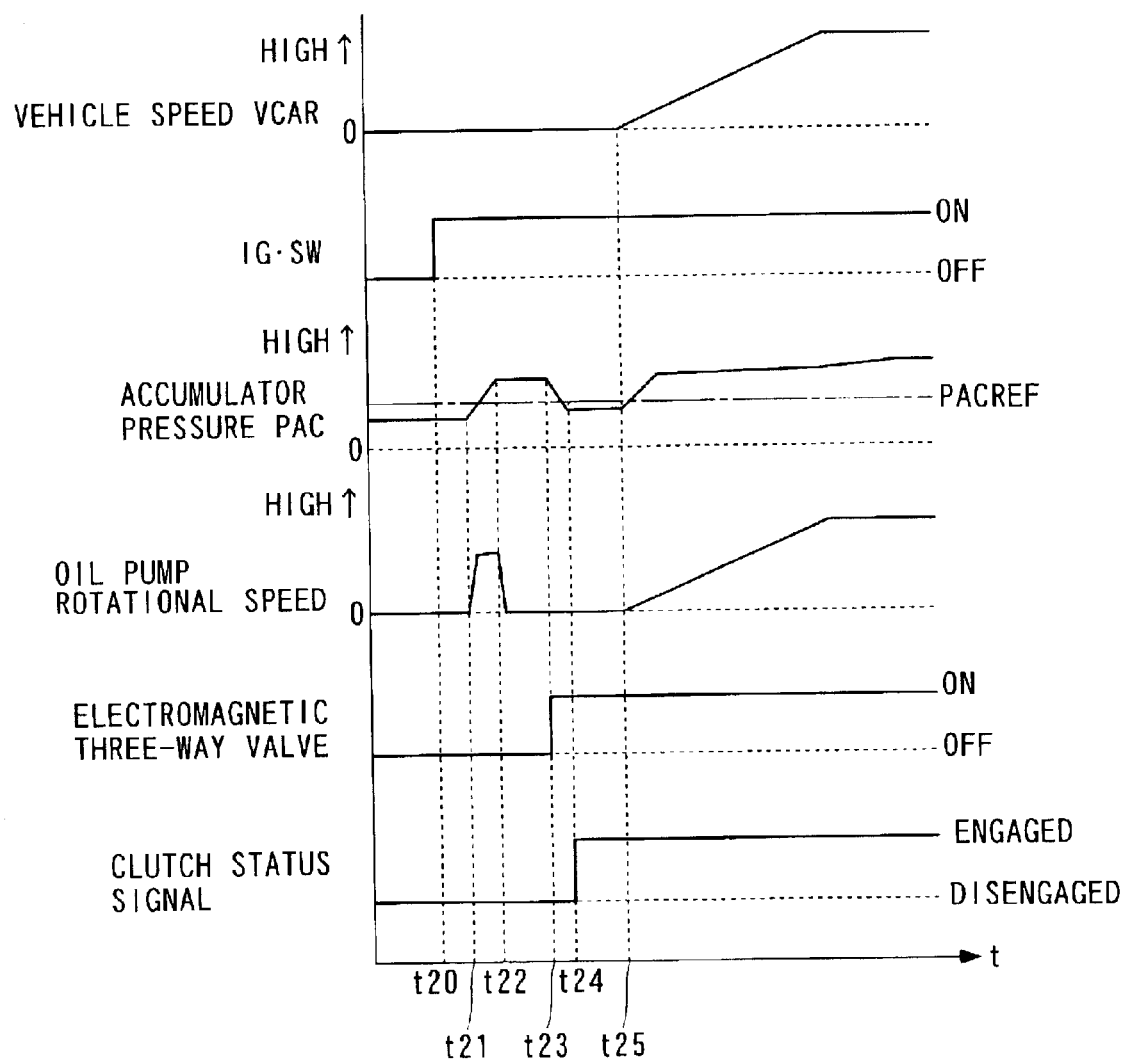
FIG. 19 is a timing chart showing an example of a vehicle start operation.
Figure 20:
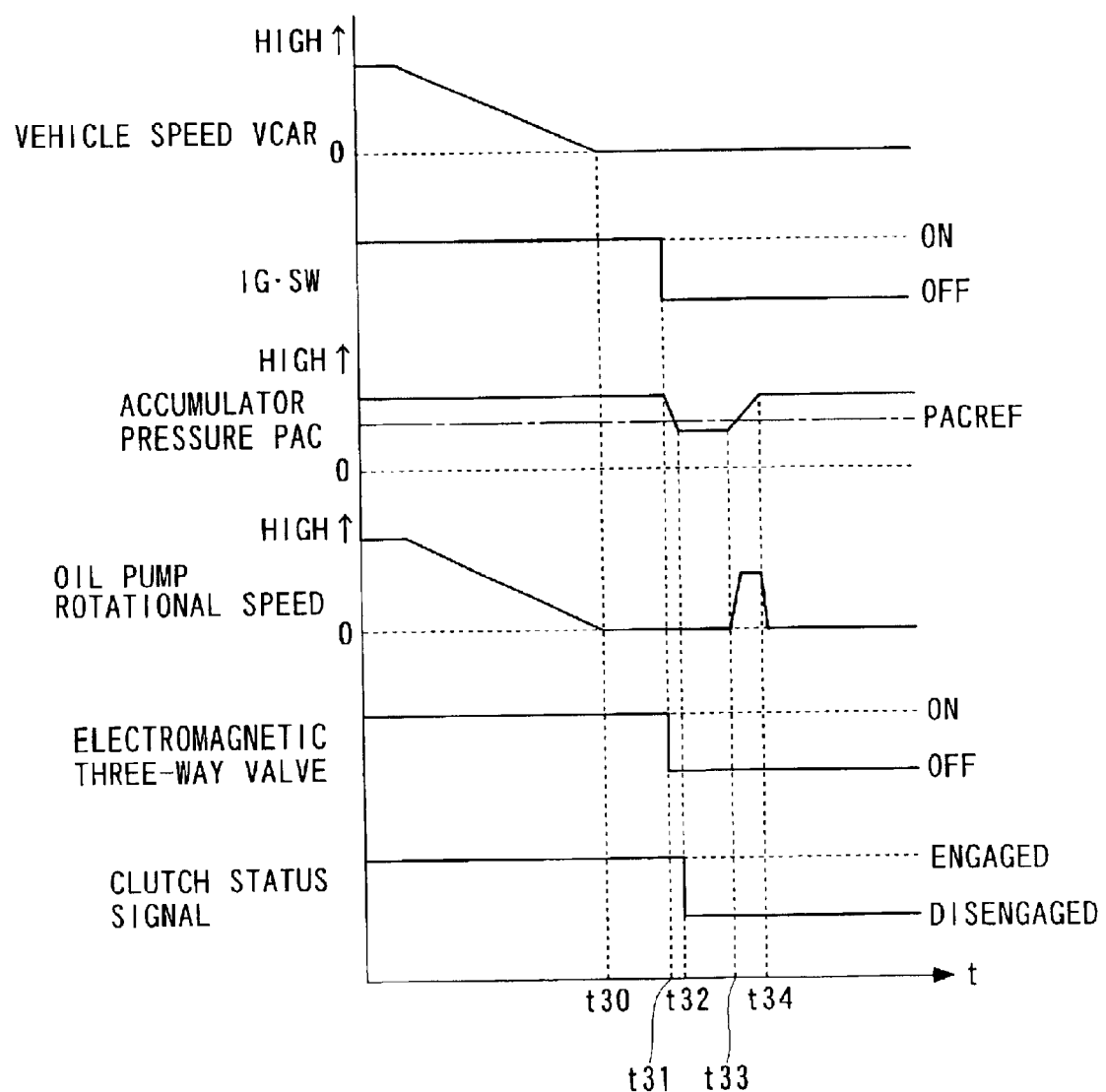
FIG. 20 is a timing chart showing an example of a vehicle stop operation.

FIG. 19 and FIG. 20 show respective examples of operations of the vehicle 2 controlled by the above control processes, at the start and the stop of the vehicle 2.

As shown in FIG. 19, when the vehicle 2 is standing with the clutch 16 being disengaged, the IG•SW 40 is turned on at a time t20, and then the motor 5 is driven at a time t21 when the number of times that the accumulator pressure PAC was equal to or lower than the operating pressure PACREF has exceeded the predetermined number of times TM_ACC_PRESS_LIM. This causes the oil pump 29 to start to increase the accumulator pressure PAC. Then, when the timer value TM_OIL_PUMP of the pressure accumulation wait timer has become larger than the predetermined threshold value TM_OIL_PUMP_LIM, i.e. at a time t22 when the accumulation of oil pressure in the accumulator 23 has been completed, the motor 5, and hence, the oil pump 29 is stopped. Thereafter, at a time t23 when the delay timer has timed out, the relay 37 is turned on, and at the same time the driving signal is delivered to the electromagnetic three-way valve 27, whereby the electromagnetic three-way valve 27 is turned on. This makes it possible to supply the accumulator pressure PAC to the hydraulic servo piston mechanism 28 via the electromagnetic three-way valve 27. The clutch 16 is engaged at a time t24 slightly delayed from the time point of turning on the electromagnetic three-way valve 27. Then, at a time t25 when the vehicle 2 performs a standing start, the oil pump 29 is driven by the rear wheels 6 or the motor 5, whereby the accumulator pressure PAC is increased.

Further, as shown in FIG. 20, after the vehicle speed VCAR is lowered until the vehicle comes to a stop at a time t30, when the IG•SW 40 is turned off at a time t31, the electromagnetic three-way valve 27 is turned off at the same time. The clutch 16 is disengaged at a time t32 slightly delayed from the time point of turning off the electromagnetic three-way valve 27. To disengage the clutch 16, the accumulator pressure PAC is supplied to the hydraulic servo piston mechanism 28, and reduced to a level equal to or lower than the operating pressure PACREF. After that, similarly to the case of FIG. 11, when the number of times that the accumulator pressure PAC was equal to or lower than the operating pressure PACREF has exceeded the predetermined number of times, i.e. at a time t33, the oil pump 29 starts to be driven by the motor 5, and the accumulator pressure PAC is accordingly increased. Then, at a time t34 when the accumulation of oil pressure in the accumulator 23 has been completed, the motor 5 and the oil pump 29 are stopped.

As described above, also in the control system 1 according to the second embodiment, it is possible to obtain the same advantageous effects as provided by the control system 1 according to the first embodiment.

It should be noted that the clutch is not limited to that of a hydraulically actuated type employed in the above respective embodiments, there may be used any suitable clutch so long as it is actuated by pressure. For instance, the clutch may be of a pneumatically actuated type or of a type actuated by water pressure.

It is further understood by those skilled in the art that the foregoing is a preferred embodiment of the invention, and that various changes and modifications may be made without departing from the spirit and scope thereof.

What is claimed is:

1. A control system for a front-and-rear wheel drive vehicle for driving one pair of respective pairs of front wheels and rear wheels by an engine and other pair of the pairs by an electric motor via a clutch of a type actuated by pressure, said control system driving the clutch by accumulator pressure increased by a pump and accumulated in an accumulator to connect and disconnect the other pair to and from and the electric motor, the control system comprising:
start-detecting means for detecting a start of the engine;
pressure-detecting means for detecting the accumulator pressure;
clutch-actuating means for selectively engaging and disengaging the clutch by supplying the accumulator pressure to the clutch, wherein said clutch-actuating means engages the clutch when the start of the engine is detected by said start-detecting means;
pump-driving means for driving the pump; and
control means for causing said pump-driving means to drive the pump to thereby increase the accumulator pressure when the detected accumulator pressure is equal to or lower than a predetermined value.

2. A control system according to claim 1, wherein said pump is an electrically driven pump, and said pump-driving means comprises an electric motor provided separately from the electric motor for driving the other pair.

3. A control system according to claim 1, wherein said pump is a mechanically driven pump, and said pump-driving means comprises means for mechanically connecting between said mechanically driven pump and the electric motor for driving the other pair.

* * * * *